(12) United States Patent
Gruhlk et al.

(10) Patent No.: US 7,511,749 B2
(45) Date of Patent: Mar. 31, 2009

(54) COLOR IMAGE SENSOR HAVING IMAGING ELEMENT ARRAY FORMING IMAGES ON RESPECTIVE REGIONS OF SENSOR ELEMENTS

(75) Inventors: Russell W. Gruhlk, Fort Collins, CO (US); Dale W. Schroeder, Scotts Valley, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 159 days.

(21) Appl. No.: 10/740,935

(22) Filed: Dec. 18, 2003

(65) Prior Publication Data

US 2005/0134712 A1 Jun. 23, 2005

(51) Int. Cl.
*H04N 5/335* (2006.01)
*H04N 5/225* (2006.01)

(52) U.S. Cl. ...................... 348/272; 348/340
(58) Field of Classification Search .............. 348/222.1, 348/265, 272, 340; 250/208.1
See application file for complete search history.

(56) References Cited

U.S. PATENT DOCUMENTS

| 3,971,065 | A | | 7/1976 | Bayer | |
|---|---|---|---|---|---|
| 4,323,925 | A | * | 4/1982 | Abell et al. | 348/340 |
| 4,506,294 | A | | 3/1985 | Nagumo | |
| 4,870,483 | A | * | 9/1989 | Nishigaki et al. | 358/512 |
| 5,353,056 | A | * | 10/1994 | Westerink et al. | 348/263 |
| 5,453,840 | A | * | 9/1995 | Parker et al. | 356/400 |
| 5,475,508 | A | | 12/1995 | Maeshima et al. | |
| 5,734,155 | A | * | 3/1998 | Rostoker | 250/208.1 |
| 5,760,834 | A | * | 6/1998 | Rostoker | 348/340 |
| 6,069,743 | A | * | 5/2000 | Nagata et al. | 359/687 |
| 6,130,448 | A | * | 10/2000 | Bauer et al. | 257/222 |
| 6,226,084 | B1 | * | 5/2001 | Tormod | 356/328 |
| 6,266,197 | B1 | * | 7/2001 | Glenn et al. | 359/819 |
| 6,611,289 | B1 | * | 8/2003 | Yu et al. | 348/265 |
| 6,766,954 | B2 | * | 7/2004 | Barkan et al. | 235/462.42 |
| 6,833,873 | B1 | * | 12/2004 | Suda | 348/340 |
| 2001/0045987 | A1 | * | 11/2001 | Sayama | 348/273 |
| 2002/0113888 | A1 | * | 8/2002 | Sonoda et al. | 348/315 |
| 2002/0163095 | A1 | * | 11/2002 | Andino et al. | 264/2.2 |
| 2005/0061950 | A1 | * | 3/2005 | Jiang et al. | 250/208.1 |

\* cited by examiner

*Primary Examiner*—David L Ometz
*Assistant Examiner*—Luong T Nguyen
(74) *Attorney, Agent, or Firm*—Ratner Prestia

(57) ABSTRACT

The color image sensor generates a color image signal representing a subject and includes an optical substrate and a light sensor. The optical substrate includes spatially-separated imaging elements. Each of the imaging elements is configured to image light of a respective color. The light sensor includes regions of sensor elements disposed opposite respective ones of the imaging elements. The sensor elements in each of the regions are operable to generate a component of the color image signal in response to the light of the respective color incident on them.

20 Claims, 9 Drawing Sheets

COLOR IMAGE SENSOR HAVING IMAGING ELEMENT ARRAY FORMING IMAGES ON RESPECTIVE REGIONS OF SENSOR ELEMENTS

RELATED APPLICATION

This application is related to U.S. patent application Ser. No. 10/741,774 of Dale W. Schroeder and Russell W. Gruhlke entitled Color Image Sensor with Imaging Elements Imaging on Respective Regions of Sensor Elements filed on Dec. 18, 2003 and incorporated into this application by reference.

BACKGROUND

Electronic image sensors are incorporated not only in digital cameras but, more recently, also into such consumer electronic products as mobile telephones and personal digital assistants (PDAs). Such products are subject to market pressure to reduce them in size, or to pack more features into a product of a given size.

FIG. 1 is a schematic isometric view of a highly simplified example of a typical conventional color image sensor 10 found in present day products such as digital cameras, mobile telephones and PDAs. Image sensor 10 is composed of a single light sensor 12 and a single imaging element 14 that forms an image of the subject on the major surface 16 of the light sensor.

Light sensor 12 is typically composed of a two-dimensional (typically rectangular) array of sensor elements and an associated read-out circuit (not shown). The boundary of an exemplary sensor element 20 is shown by a broken line. The example of light sensor 12 shown is highly simplified in that it has only 48 sensor elements. A typical light sensor has hundreds of thousands or millions of sensor elements. Each sensor element is typically a complementary metal-oxide-semiconductor (CMOS) sensor element or a charge-coupled device (CCD) sensor element. The read-out circuit receives the electrical values generated by the sensor elements in response to light from the subject and converts the electrical values into an analog or digital image signal, typically in raster-scan order. To enable the light sensor to generate a color image signal that additionally provides color information regarding the subject, the light sensor additionally incorporates a color mosaic filter 30 on major surface 16.

The most common type of color mosaic filter is the Bayer color mosaic filter, named after its inventor. The example of the Bayer color mosaic filter 30 shown in FIG. 1 has N/4 red filters, N/2 green filters and N/4 blue filters, where N is the number of sensor elements 20 in light sensor 12. The red filters, green filters and blue filters will be generically referred to herein as color filters. Each color filter filters the light incident on a respective one of the sensor elements of the light sensor. The color filters are arranged in square blocks of four, an exemplary one of which is shown at 32. Block 32 is composed of a red filter 34, two green filters 36 and 37 diagonally opposite one another, and a blue filter 38. The remaining blocks of color filters are similar in structure. The colors of the filters are indicated in FIG. 1 by different hatching. Many variations of the Bayer pattern have been tried, including a pseudo random arrangement of the color filters and use of filters of four or more colors.

Each sensor element 20 generates an electrical value that represents the intensity of the light incident on the sensor element. The light incident on the sensor element is of the color transmitted by the color filter overlying the sensor element. For example, the sensor element under the red filter 34 generates an electrical value that represents the intensity of red light incident on the sensor element. Since a color image signal representing a color image typically includes electrical values representing the intensities of red light, green light and blue light incident on the color filter over each sensor element of light sensor 12, the light sensor additionally includes a processing circuit (not shown) that receives the electrical values from the read-out circuit (not shown) connected to the sensor elements and synthesizes the missing electrical values for each sensor element. The processing circuit synthesizes the missing electrical values by interpolation using the electrical values generated by neighboring ones of the sensor elements.

The processing circuit generates the color image signal by synthesizing a red value and a blue value for each sensor element covered by a green filter, a green value and a blue value for each sensor element covered by a red filter and a red value and a green value for each sensor element covered by a blue filter. For example, the processing circuit synthesizes a green value for the sensor element covered by red filter 34 from the electrical values generated by the sensor elements covered by green filters 36 and 37, and possibly additionally from other neighboring sensor elements covered by green filters. The electrical values from which the green value is synthesized are all green values. Two thirds of the resulting color image signal is synthesized by interpolating from the electrical values generated by the neighboring sensor elements covered with filters of the appropriate color.

The need to synthesize the missing electrical values in conventional light sensor 12 causes many problems with certain types of subject when a picture is displayed in response to the color image signal. Adjacent areas of the picture with sharp color differences can produce false colors. Almost horizontal or vertical lines are displayed with jagged edges and can exhibit color problems. Conventional color image sensor 10 typically additionally includes a spatial filter (not shown) interposed between imaging element 14 and light sensor 12. The spatial filter reduces the high spatial frequency content of the image formed on light sensor 12. This ameliorates some of the effects just described at the expense of a displayed picture that is less sharp than the sharpness implied by the number of sensor elements 20 in light sensor 12 and the optical quality of imaging element 14.

Another problem of conventional light sensor 12 is that light leakage from one sensor element to a neighboring sensor element not only causes blurring in the displayed picture but additionally causes false color.

A further problem with conventional color image sensor 10 arises because imaging element 14 forms an image on light sensor 12 in polychromatic light. Consequently, imaging element 14 must be color corrected to ensure that the image it forms on light sensor 12 is sharp for all colors. This typically requires that imaging element 14 be a multi-component lens, which is typically larger than a single-component lens in the direction of light transmission through the lens. This increases the overall depth of the color image sensor. A large image sensor depth is particularly undesirable in the highly-miniaturized applications described above. The need for color correction additionally limits the choice of lens material.

A further problem with conventional color image sensor 10 is that all the sensor elements use the same exposure time regardless of the color of the overlying color filter. This limits the dynamic range of the image sensor. For example, if a subject includes a bright green region, the exposure time of light sensor 12 must be reduced to avoid saturating the sensor elements having green filters. The same reduced exposure is also applied to the sensor elements having red and blue filters, so that the electrical values generated by those of the sensor elements on which a subtle red portion of the subject is imaged will include an unwanted noise component.

A final problem with conventional color image sensor 10 is its low light performance. The color filters cause the underlying sensor elements to receive typically only a fraction of the light incident on the color filters.

Thus, what is needed is a color image sensor that does not suffer from the problems described above.

SUMMARY OF THE INVENTION

The invention provides in a first aspect a color image sensor for generating a color image signal representing a subject. The color image sensor includes an optical substrate and a light sensor. The optical substrate includes spatially-separated imaging elements. Each of the imaging elements is configured to image light of a respective color. The light sensor includes regions of sensor elements disposed opposite respective ones of the imaging elements. The sensor elements in each of the regions are operable to generate a component of the color image signal in response to the light of the respective color incident on them.

The invention provides in a second aspect a method of making a color image sensor in which an imaging element array having an optical substrate and side pieces is molded, a light sensor is provided and the imaging element array is affixed to the light sensor. The optical substrate has spatially-separated imaging elements, each configured to image light of a respective color. The light sensor includes regions of sensor elements. Each of the regions is operable to generate an image signal component in response to light of the respective color incident on it. The imaging element array is affixed to the light sensor with the imaging elements disposed opposite respective ones of the regions.

Finally, the invention provides in a third aspect a method for generating a color image signal representing a subject in which images of the subject are formed independently and in parallel in light of different colors and the images are converted into respective image signal components of the color image signal.

Embodiments of the invention generate a color image signal without using color mosaic filter. Dispensing with the color mosaic filter allows the area of each region of the light sensor to be reduced compared with the area of the conventional light sensor. This allows the imaging elements to be made smaller and be located to the light sensor. Moreover, in embodiments in which the images are formed in narrow-band light, the imaging elements can be simpler and therefore smaller than conventional imaging elements. In some embodiments, the imaging elements incorporate diffractive elements that are significantly smaller in depth than a lens with similar properties. In other embodiments, each imaging element is as simple as a single diffractive element or a single aspherical convex surface.

Defining the imaging elements in an optical substrate to form an imaging element array that is molded as a single unit precisely defines the relative locations of the imaging elements. The locations of the respective regions in the light sensor are also precisely defined photolithographically during fabrication of the light sensor. With the relative locations of the imaging elements precisely defined and the relative locations of the regions of sensor elements precisely defined, only a single alignment operation is needed to align the imaging elements with their respective regions of sensor elements. Moreover, this alignment can be performed once for an entire wafer of light sensors.

Other embodiments of the imaging element array provide a mount for a conventional polychromatic imaging element in embodiments that form at least one of the images in broad-spectrum light, e.g., white light.

DETAILED DESCRIPTION

Figure 2:
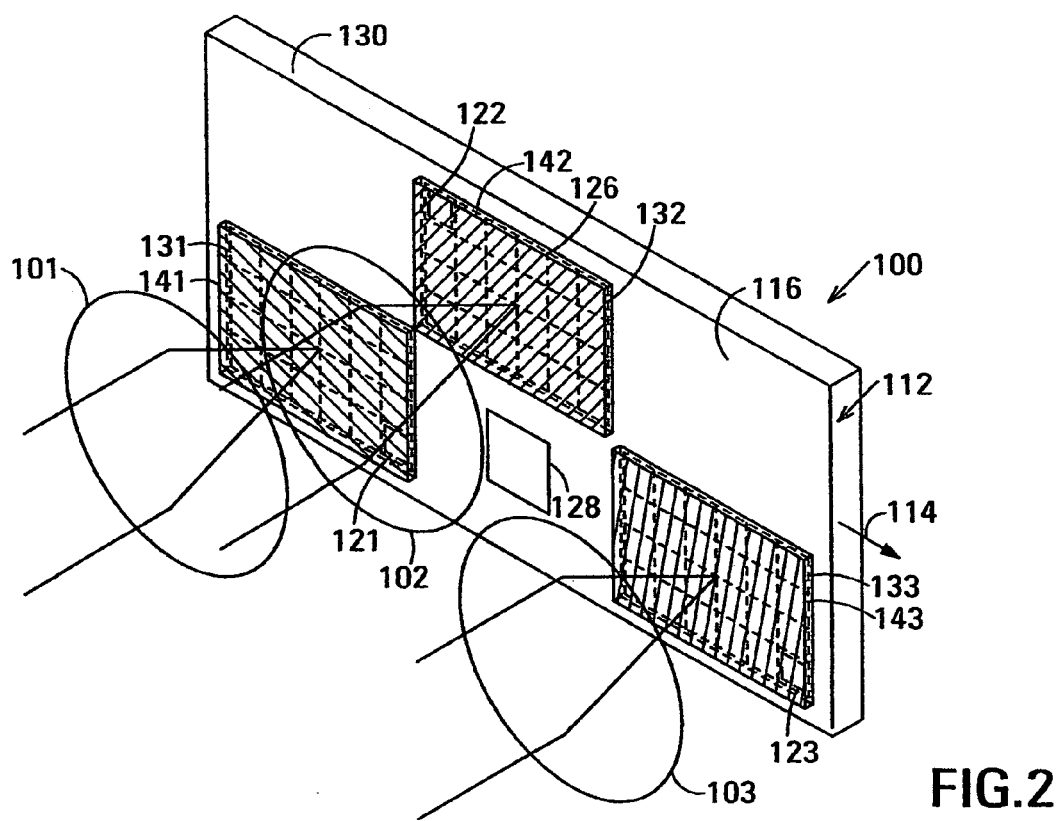
FIG. 2 is an isometric view of a highly simplified first embodiment of a color image sensor in accordance with the invention.

FIG. 2 is an isometric view of a highly simplified first embodiment 100 of a color image sensor in accordance with the invention. Color image sensor 100 generates a color image signal representing a subject and is composed of a light sensor 112 and imaging elements shown schematically at 101, 102 and 103. Light sensor 112 has sensor elements arranged on its major surface 116. In operation, the light sensor generates a color image signal 114 in response to light incident on major surface 116. Imaging elements 101, 102 and 103 are arranged to form images of the subject in light of different colors on respective regions 131, 132 and 133 of light sensor 112. The regions of the light sensor on which the images are formed are substantially spatially separated to prevent light leakage among the images.

In color image sensor 100, the sensor elements are arranged in an irregular array in which each of regions 131, 132 and 133 is composed of a rectangular array of sensor elements. Broken lines indicate the boundary of an exemplary sensor element 121 in region 131, an exemplary sensor element 122 in region 132 and an exemplary sensor element 123 in region 133. Additional broken lines, such as the broken line 126, indicate the boundaries between adjacent ones of the sensor elements in each of the regions 131, 132 and 133. In the descriptions of this embodiment and the embodiments described below, the reference numeral of the exemplary sensor element in each region will additionally be used to refer to all the sensor elements in the region. Each sensor element is a complementary metal-oxide-semiconductor (CMOS) sensor element. Each sensor may alternatively be a charge-coupled device (CCD) sensor element or another suitable type of sensor element.

The example of light sensor 112 shown in FIG. 2 is highly simplified in that each of its regions has only 24 sensor elements. A typical example of light sensor 112 has hundreds of thousands or millions of sensor elements in each of regions 131-133. The light sensors in the embodiments of the color image sensor described below are also similarly highly simplified. Moreover, the Figures of this disclosure are schematic in the sense that they do not depict the effect of the imaging elements on the appearance of objects seen through the imaging elements.

Each of the regions 131, 132 and 133 of light sensor 112 has an associated read-out circuit (not shown). Each read-out circuit receives the electrical values generated by the sensor elements in the region in response to light from the subject and converts the electrical values into an analog or digital image signal component, typically in raster-scan order. Alternatively, light sensor 112 may have a single read-out circuit common to all regions. The image signal components generated by regions 131-133, or signals derived from the image signal components, collectively constitute color image signal 114 that represents the subject.

As noted above, imaging elements 101, 102 and 103 form images of the subject in light of different colors on regions 131, 132 and 133, respectively, of light sensor 112. To this end, color image sensor 100 is additionally composed of a color filter 141 optically arranged in series with imaging element 101 and region 131, a color filter 142 optically arranged in series with imaging element 102 and region 132 and a color filter 143 optically arranged in series with imaging element 103 and region 133. An imaging element, a region and a color filter are optically arranged in series when light that is incident on the region has passed through the imaging element and the color filter in either order.

In the example shown in FIG. 2, color filter 141 is located on the major surface 116 of light sensor 112 between imaging element 101 and region 131 of the light sensor, color filter 142 is located on the major surface of the light sensor between imaging element 102 and region 132 of the light sensor and color filter 143 is located on the major surface of the light sensor between imaging element 103 and region 133 of the light sensor. In an alternative arrangement, color filters 141, 142 and 143 are independently supported between imaging elements 101, 102 and 103 and regions 131, 132 and 133, respectively. In another alternative arrangement, color filters 141, 142 and 143 are supported by imaging elements 101, 102 and 103, respectively. For example, the color filters may each be located on a surface of the respective imaging element. The surface on which the color filter is located may be one facing the subject or one facing the light sensor. In another arrangement, color filters 141, 142 and 143 are located between the subject and imaging elements 101, 102 and 103, respectively. Other arrangements are possible.

In the example shown in FIG. 2, color filter 141 is a red filter that transmits red light to region 131 of light sensor 112, color filter 142 is a green filter that transmits green light to region 132 and color filter 143 is a blue filter that transmits blue light to region 133. In other embodiments, the colors of color filters 141-143 are different from those described.

Figure 1:
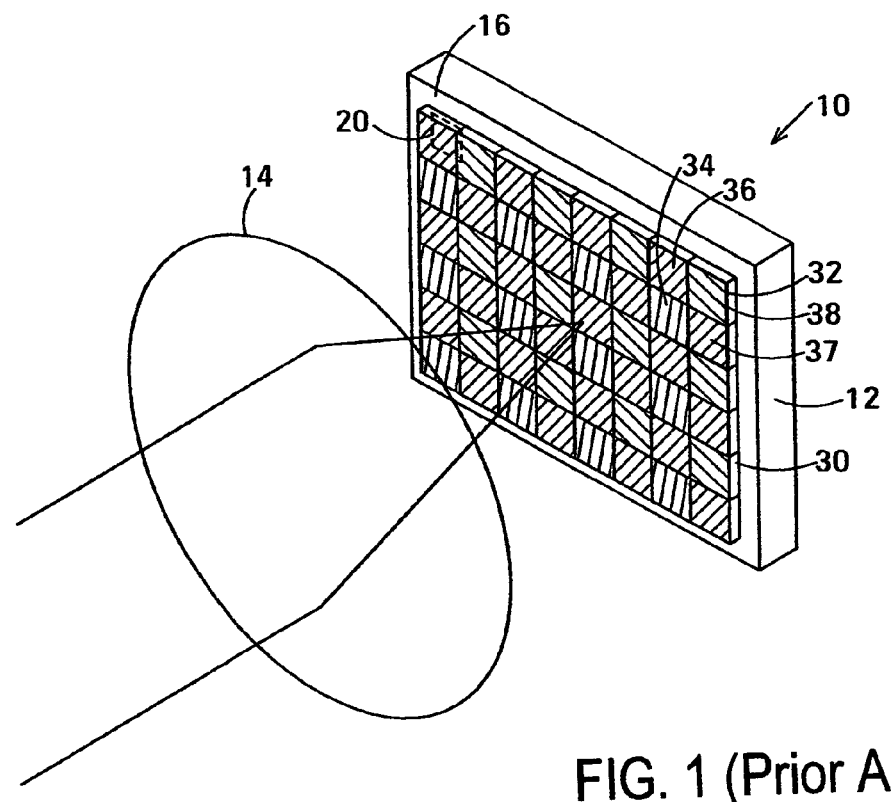
FIG. 1 is an isometric view of a highly simplified example of a conventional color image sensor.

The overall depth of color image sensor 100, i.e., the distance between the major surface of light sensor 112 opposite major surface 116 and the surface of imaging elements 101-103 remote from light sensor 112, is at least about 30% less than that of conventional color image sensor 10 described above with reference to FIG. 1. Two main factors contribute to the reduction in depth.

First, the distance between imaging elements 101-103 and light sensor 112 in color image sensor 100 is less than that between imaging element 14 and light sensor 12 in conventional color image sensor 10. The lack of a mosaic color filter in color image sensor 100 significantly reduces the spatial filtering needed to reduce spatial artifacts to a specified level, and may eliminate the need for spatial filtering. With reduced spatial filtering, light sensor 112 provides a specified spatial resolution with each of the regions 131-133 having no more than about half the number of sensor elements of conventional light sensor 12 shown in FIG. 1. Regions 131-133 therefore each have linear dimensions of approximately $1/\sqrt{2}$ of those of conventional light sensor 12. To form images that fully cover regions 131-133, the distance between imaging elements 101-103 and light sensor 112 can be reduced in proportion to the reduction in the linear dimensions of the region, i.e., by approximately $1/\sqrt{2}$, or about 30%, relative to the distance between imaging element 14 and light sensor 12 in conventional color image sensor 10. Additionally, the dimensions of the imaging elements themselves are reduced in proportion to the reduction in the linear dimensions of the region.

Second, in color image sensor 100, the depth of imaging elements 101-103 is less than that of imaging element 14 of color image sensor 10. In color image sensor 100, imaging elements 101-103 form images on regions 131-133 of light sensor 112 in narrow-band light of mutually different colors. Narrow-band light has a range of wavelengths that is typically perceived as a single primary color, e.g., red, green or blue. Light composed at least of components from across the visible spectrum will be referred to as broad-spectrum light. Broad-spectrum light that is perceived as white light will be called white light, and white will be regarded as a color for the purpose of this disclosure. Even though the imaging elements 101-103 transmit broad-spectrum light in the example shown in FIG. 2, color filters 141-143 transmit only narrow-band light from imaging elements 101-103, respectively, to the sensor elements in regions 131-133, respectively, of light sensor 112. Thus, with respect to forming images on light sensor 112, only the imaging properties of imaging elements 101-103 with respect to the narrow-band light transmitted by color filters 141-143, respectively, need be considered. This allows imaging elements 101-103 to be simpler in configuration than imaging element 14, which forms an image in broad-spectrum light. Because they can be regarded as forming images only in narrow-band light, imaging elements 101-103 require little, if any, color correction. Therefore, each of imaging elements 101-103 needs fewer components than imaging element 14 to form an image of a specified optical quality. Moreover, as noted above, each of the components is smaller in size. Reducing the number of components and their size in imaging elements 101-103 reduces the depth of the imaging elements compared with imaging element 14.

As will be described in detail below, each of imaging elements 101-103 that forms an image in narrow-band light can be as simple as a single convex, aspherical surface. Moreover, imaging elements 101-103 forming the images on regions 131-133 in narrow-band light allows imaging elements 101-103 to incorporate one or more diffractive components instead of corresponding refractive components. Diffractive components are typically less deep than refractive components with similar optical properties. Using diffractive components provides a further reduction in the depth of imaging elements 101-103 compared with imaging element 14, and, hence, of color image sensor 100 compared with color image sensor 10. An embodiment of color image sensor 100 that incorporates an embodiment of an imaging element array similar to that described below with reference to FIGS. 11A-11D has an overall depth about 60% less than that of an otherwise comparable conventional color image sensor.

As noted above, color image sensor 100 suffers from fewer spatial frequency artifacts than color image sensor 10 notwithstanding the smaller number of sensor elements in each of the regions 131-133. Color image sensor 100 provides additional performance advantages. First, since imaging elements 101-103 form an image of the subject on regions 131-133, respectively, of light sensor 112 in light of a different color, an auxiliary circuit shown schematically at 128 can include an exposure control circuit that applies exposure control to each of the regions independently. The independent exposure control sets the exposure with which an image is captured by the sensor elements in each of the regions 131-133 to provide an optimum relationship between the dynamic range of the light incident on the region and the dynamic range of the sensor elements in the region. Conventional exposure control techniques can be used to provide the exposure control applied independently to each of the regions.

In embodiments of color image sensor 100 in which auxiliary circuit 128 incorporates an independent exposure control circuit, auxiliary circuit 128 additionally incorporates a normalizing circuit for each of the regions 131-133. Each normalizing circuit operates in response to exposure data provided by the exposure control to process the image signal component generated by its respective region to compensate for differences, if any, in exposure between the regions. The normalizing circuit of the region having the shortest exposure time leaves the image signal component generated by the region unchanged. The normalizing circuit of any region having a longer exposure time attenuates the image signal component generated by the region proportionally to the ratio of the exposure of the region to the shortest exposure. The normalizing circuits correct the level relationship among the image signal components to that which would be obtained if all the regions of light sensor 112 had the same exposure. The attenuation not only attenuates the image signal component, but also attenuates any noise mixed with the image signal component. This increases signal-to-noise ratio of the image signal component, and, hence of the color image signal, relative that obtained with all the regions having the same exposure equal to the shortest exposure.

Each of the regions 131-133 of light sensor 112 has fewer sensor elements than conventional light sensor 12 described above with reference to FIG. 1. Thus, at a given read-out rate, the time required to read out the image signal component from any one of the regions 131-133 of light sensor 112 is less than that required to read out the color image signal from light sensor 12. Moreover, in light sensor 112, the read-out time advantage of the individual regions 131-133 is preserved by reading out all the regions 131-133 in parallel. Thus, a complete color image signal composed of three image signal components can be read out from light sensor 112 faster than the color image signal can be read out from conventional light sensor 12. As a result, color image sensor 100 has reduced rolling shutter artifacts compared with conventional color image sensor 10.

The reduced read-out time of color image sensor 100 and the lack of interpolation processing performed by some embodiments of color image sensor 100 allow color image sensor 100 to take pictures at a faster rate than conventional color image sensor 10.

In the example shown in FIG. 2, light sensor 112 is composed of a silicon substrate 130 on which sensor elements similar to sensor elements 121, 122, 123 are fabricated in regions 131, 132 and 133, respectively, using conventional semiconductor processing. Portions of the sensor elements may be located in substrate 130, but will be regarded as being "on" the substrate for the purpose of the following description. Portions of the substrate outside regions 131-133 in which the sensor elements are located may be occupied by auxiliary circuit 128 that includes such circuits as exposure control circuits and signal processing circuits that process the image signal components and/or the color image signal derived from the image signal components as will be described below.

The above-mentioned signal processing circuits located on substrate 130 as part of auxiliary circuit 128 may perform such functions as compressing the image signal components and/or the color image signal, converting the color image signal to a JPEG or MPEG-format color image signal, etc. Another possible function of a signal processing circuit that forms part of auxiliary circuit 128 is to sum the red, green and blue image signal components generated by regions 131-133, respectively, to generate a luminance signal, and to subtract the red image signal component and the blue image signal component from the luminance signal to generate respective color difference signals, as is known in the art. In some embodiments, the luminance signal and the color difference signals collectively constitute the color image signal. In other embodiments, the red, green and blue image signal components collectively constitute the color image signal. The color image signal may be constituted differently from the examples just described.

After the sensor elements and associated circuits have been fabricated on substrate 130, color filters 141-143 of different colors are applied to the major surface 116 of the substrate.

In an alternative embodiment, each of the regions 131-133 of sensor elements is fabricated on an individual substrate (not shown). Each substrate may additionally have fabricated thereon one or more circuits associated with the sensor elements, as described above. The individual region-sized substrates are then mounted on a board, such as a printed circuit board, that defines positional relationships among the substrates. The sensor elements fabricated on the individual substrates collectively form an array of sensor elements, with the sensor elements fabricated on each of the individual substrates constituting a respective region of the array.

In the example shown, regions 131-133 are located in light sensor 112 with their centers at the apices of a triangle. This juxtaposes pairs of the regions only at their adjacent corners. This arrangement minimizes the leakage of light to an adjacent region from the image formed on each of the regions 131-133 of light sensor 112. Such light leakage is undesirable as it can form "ghosts" in pictures displayed in response to color image signal 114 generated by color image sensor 100. Light-absorbing screens similar to those described below with reference to FIGS. 7-9 can be located between adjacent portions of regions 131-133 to eliminate residual leakage of light.

The example of color image sensor 100 shown in FIG. 2 has equal numbers of sensor elements in each of the regions 131-133 of light sensor 112. However, many color imaging systems operate with less chrominance information than luminance information. To reduce the amount of chrominance information, auxiliary circuit 128 can include a circuit that down samples the color difference signals to reduce their information content. Alternatively, regions 131 and 133 can be structured to generate respective image signal components with less information content.

Figure 3:
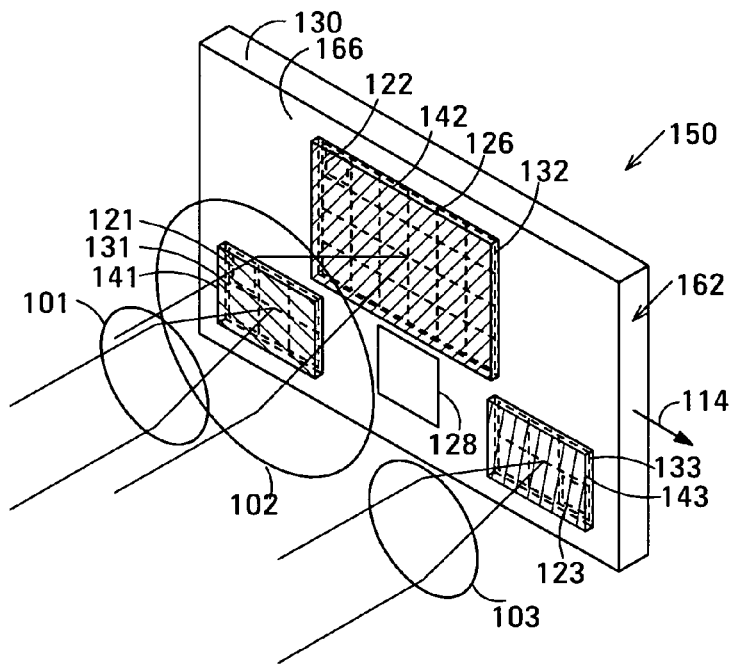
FIG. 3 is an isometric view of a highly simplified second embodiment of a color image sensor in accordance with the invention.

FIG. 3 is an isometric view of a highly simplified second embodiment 150 of a color image sensor in accordance with the invention suitable for use in applications that operate with less chrominance information than luminance information. Elements of color image sensor 150 that correspond to elements of color image sensor 100 described above with reference to FIG. 2 are indicated by the same reference numerals and will not be described again in detail.

In color image sensor 150, the regions 131 and 133 of light sensor 162 on which respective images are formed in light more remote from to the center of the visible spectrum, i.e., red light or blue light, each have fewer sensor elements than region 132 on which an image is formed in light closer to the center of the visible spectrum, i.e., green light. In the example shown, the ratio of the number of sensor elements in each of regions 131 and 133 to the number of sensor elements in region 132 (the sensor element ratio) is 1/4. Other sensor element ratios, such as 1/2, are possible.

In color image sensor 150, the sensor elements in all of the regions 131-133 are equal in size: for example, sensor elements 121 in region 131, 122 in region 132 and 123 in region 133 are all equal in area and linear dimensions. As a result, regions 131 and 133 are smaller in area than region 132 in proportion to the sensor element ratio, and are smaller in linear dimensions by approximately the square root of the sensor element ratio. Additionally, imaging elements 101 and 103 are smaller in diameter than imaging element 102, and the distance between imaging elements 101 and 103 and major surface 166 is smaller than the distance between imaging element 102 and major surface 166 approximately in proportion to the square root of the sensor element ratio. Finally, color filters 141 and 143 are smaller in linear dimensions than color filter 142 approximately in proportion to the square root of the sensor element ratio.

In some embodiments of color image sensor 150, auxiliary circuit 128 includes a circuit that up-samples the image signal components generated by the read-out circuits (not shown) of regions 131 and 133 to provide a red value and a blue value corresponding to each green value in the image signal component generated by the read-out circuit (not shown) of region 132. Up-sampling techniques are known in the art and will not be described here. In the embodiments described below in which some of the regions have fewer sensor elements than others, auxiliary circuit 128 may include a circuit that performs up-sampling.

The design of the imaging elements can be simplified so that they are all the same size and are located at the same distance from the major surface of the light sensor by increasing the size of the sensor elements in the regions on which images are formed in light more remote from to the center of the visible spectrum relative to those in the region on which an image is formed in light closer to the center of the visible spectrum to make all the regions of the light sensor equal in area and linear dimensions.

Figure 4:
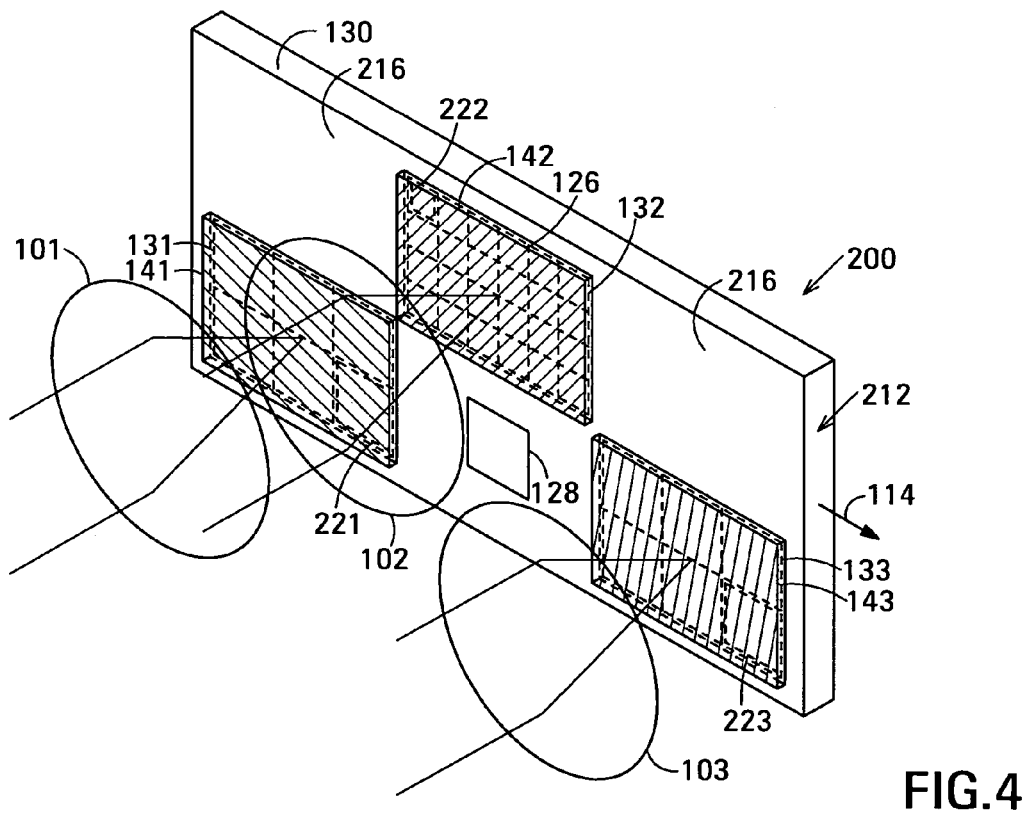
FIG. 4 is an isometric view of a highly simplified third embodiment of a color image sensor in accordance with the invention.

FIG. 4 is an isometric view of a highly simplified third embodiment 200 of a color image sensor in accordance with the invention in which the regions 131-133 of light sensor 212 are equal in area and linear dimensions. Color image sensor 200 is suitable for use in applications that operate with less chrominance information than luminance information. In color image sensor 200, the regions 131 and 133 of light sensor 212 on which respective images are formed in light more remote from to the center of the visible spectrum, i.e., red light and blue light, each have fewer sensor elements than region 132 of the light sensor on which an image is formed in light closer to the center of the visible spectrum, i.e., green light. In the example shown, the sensor element ratio is 1/4. Other sensor element ratios, such as 1/2, are possible. Elements of color image sensor 200 that correspond to elements of color image sensor 100 described above with reference to FIG. 2 are indicated by the same reference numerals and will not be described again in detail.

In color image sensor 200, all the regions 131, 132 and 133 of light sensor 212 are equal in size, but sensor elements 221 in region 131 and sensor elements 223 in region 133 of the light sensor on which respective images are formed in light more remote from to the center of the visible spectrum, i.e., red light and blue light, are fewer in number but larger in area and linear dimensions than sensor elements 222 in region 132 of the light sensor on which an image is formed in light closer to the center of the visible spectrum, i.e., green light. Sensor elements 221 in region 131 and sensor elements 223 in region 133 are larger in area than sensor elements 222 in region 132 in proportion to the reciprocal of the sensor element ratio and are larger in linear dimensions by approximately the reciprocal of the square root of the sensor element ratio. Imaging elements 101, 102 and 103 are equal in diameter and are all located the same distance from the major surface 216 of light sensor 212. This simplifies the design of the imaging elements compared with the color image sensor shown in FIG. 3. Finally, color filters 141, 142 and 143 are all equal in size.

In some embodiments of color image sensor 200, the image signal components generated by regions 131 and 133 are up-sampled, as described above.

In the embodiments of the color image sensor described above, the sensor elements are all fabricated in the same substrate, which is typically single-crystal silicon. The light-to-carrier conversion efficiency of silicon varies with wavelength across the visible spectrum. Moreover, color filters 141-143 have different residual attenuations with respect to the light they transmit. In the embodiment described above with reference to FIG. 4, the larger size of sensor elements 221 and 223 in regions 131 and 133, respectively, relative to sensor elements 222 in region 132 results in color image sensor 200 having a higher sensitivity in the remote portions of the visible spectrum than in the middle of the visible spectrum. This compensates for the lower sensitivity of silicon to blue light relative to green light and therefore increases the signal-to-noise ratio of the blue image signal component generated by region 133. However, the larger size of sensor elements 221 in region 131 may provide too much sensitivity to red light, leading to saturation effects. The different sensitivities of the regions of the light sensor to the light of the different colors are typically equalized by scaling the image signal components generated by the respective regions in inverse proportion to the sensitivity of the sensor elements in the region to the color of light incident on the region.

Figure 5:
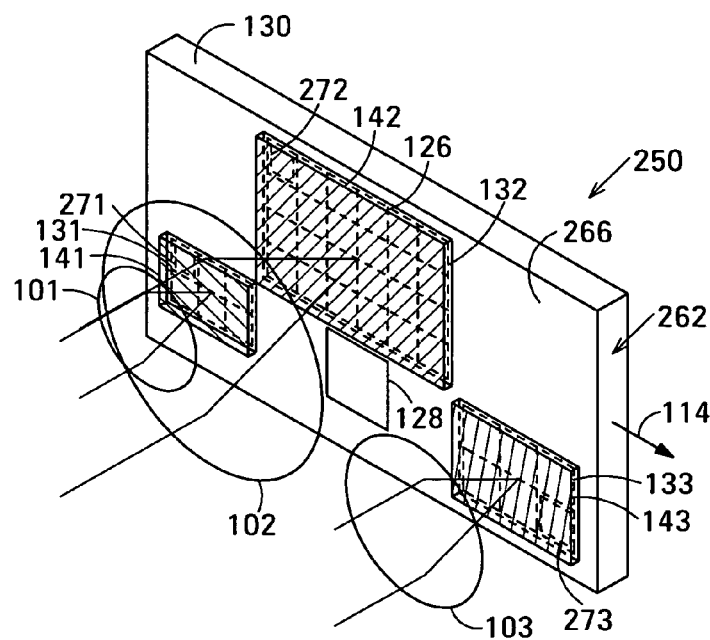
FIG. 5 is an isometric view of a highly simplified fourth embodiment of a color image sensor in accordance with the invention.

FIG. 5 is an isometric view of a highly-simplified fourth embodiment 250 of a color image sensor in accordance with the invention in which sensor elements in the respective regions of the light sensor differ in area to provide the regions with approximately equal sensitivity to the light from the subject in the respective colors. Color image sensor 250 is suitable for use in applications that operate with less chrominance information than luminance information. In color image sensor 250, regions 131 and 133 of light sensor 262 on which respective images are formed in light more remote from to the center of the visible spectrum, i.e., red light and blue light, each have fewer sensor elements than region 132 of the light sensor on which an image is formed in light closer to the center of the visible spectrum, i.e., green light. In the example shown, the sensor element ratio is 1/4. Other sensor element ratios, such as 1/2, are possible. Elements of image sensor 250 that correspond to elements of image sensor 100 described above with reference to FIG. 2 are indicated by the same reference numerals and will not be described again in detail.

In color image sensor 250, sensor elements 271 in region 131 and sensor elements 273 region of light sensor 262 on which respective images are formed in light more remote from to the center of the visible spectrum, i.e., red light and blue light, are fewer in number than sensor elements 272 in region 132 of the light sensor on which an image is formed in light closer to the center of the visible spectrum, i.e., green light. Moreover, the sensor elements in each of the regions 131-133 differ in area and linear dimensions to equalize their sensitivity to light of the color incident on them. For example, an embodiment of a silicon-based sensor element has a sensitivity to blue light with a wavelength of about 450 nm typically about 0.67 of its sensitivity to green light with a wavelength of about 550 nm, and has a sensitivity to red light with a wavelength of about 650 nm typically about 1.25 of its sensitivity to green light. In color image sensor 250, the sensitivity of the regions is equalized to the light of the respective colors by making the area of sensor elements 271 in region 131 on which the image is formed in red light about 0.8 of the area of sensor elements 272 in region 132 on which the image is formed in green light, and by making the area of sensor elements 273 in region 133 on which the image is formed in blue light about 1.5 times the area of sensor elements 272. Put another way, the linear dimensions of sensor elements 271 are about 0.9 of those of sensor elements 272 and the linear dimensions of sensor elements 273 are about 1.25 times those of sensor elements 272.

As a result, regions 131 and 132 have an area ratio equal to the product of the area ratio of sensor element 271 and sensor element 272 and the sensor element ratio, and a ratio of linear dimensions equal to the product of the ratio of the linear dimensions of sensor element 271 and sensor element 272 and the sensor element ratio. Similarly, regions 133 and 132 have an area ratio equal to the product of the area ratio of sensor element 273 and sensor element 272 and the sensor element ratio, and a ratio of linear dimensions equal to the product of the ratio of the linear dimensions of sensor element 273 and sensor element 272 and the sensor element ratio.

Additionally, in this embodiment, imaging elements 101 and 102 have a diameter ratio and distance ratio equal to the product of the ratio of the linear dimensions of sensor elements 271 and 272 and the sensor element ratio. Similarly, imaging elements 103 and 102 have a diameter ratio and distance ratio equal to the product of the ratio of the linear dimensions sensor elements 273 and 272 and the sensor element ratio. The distance ratio is the ratio of the distances of the respective imaging elements from major surface 266. Finally, color filters 141, 142 and 143 have areas and linear dimensions similar to those of regions 131, 132 and 133, respectively.

Different ratios of area and linear dimensions from those just described may be used additionally to equalize the sensitivities of regions 131, 132 and 133 notwithstanding differences in the residual attenuation of the light transmitted by color filters 141, 142 and 143.

In the embodiments of the color image sensor described above, a narrow-band color filter is located between each of the imaging elements and a respective region of the light sensor to cause the image to be formed on each region in light of a different color. Each color filter allows only a relatively small fraction of the light from the subject incident thereon to reach the sensor elements in the underlying region of the light sensor because the color filter blocks all but a narrow range of wavelengths of the light reflected by the subject. This degrades the signal-to-noise ratio of the color image signal output by the color image sensor, especially under low-light conditions.

Figure 6:
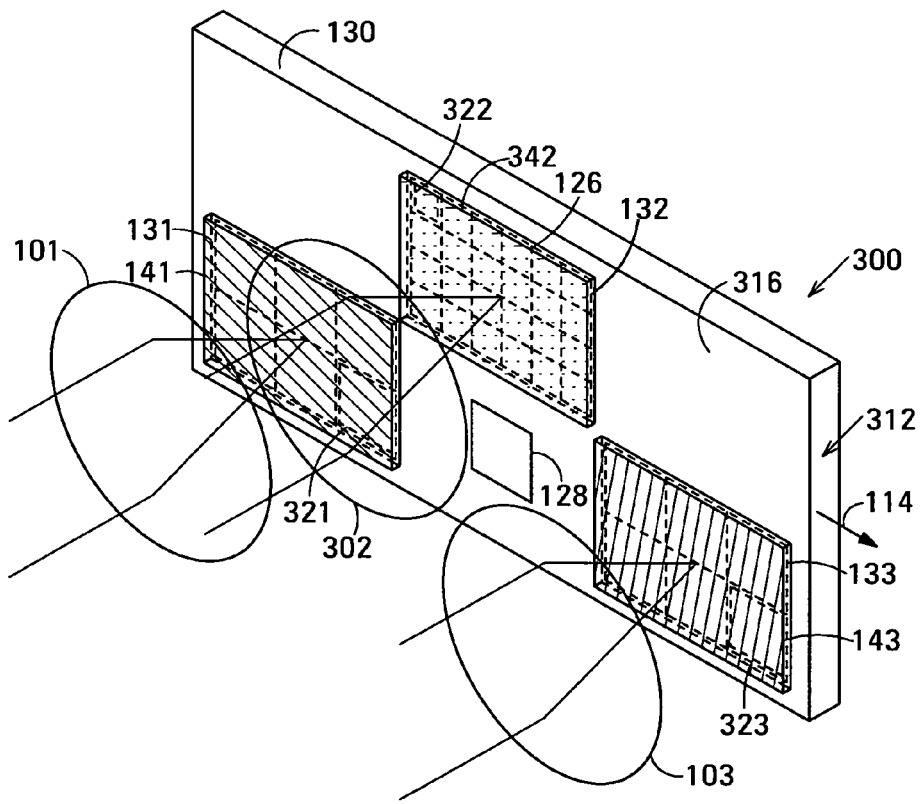
FIG. 6 is an isometric view of a highly simplified fifth embodiment of a color image sensor in accordance with the invention.

FIG. 6 is an isometric view of a highly simplified fifth embodiment 300 of a color image sensor in accordance with the invention having a significantly higher signal-to-noise ratio than a conventional color image sensor and than the above-described embodiments of the color image sensor in accordance with the invention. In this embodiment, an image of the subject is formed on region 132 of light sensor 312 in white light and images of the subject are formed on the remaining regions 131 and 133 of the light sensor in narrow band light, typically narrow-band light in wavelength bands more remote from to the center of the visible spectrum, e.g., red light and blue light.

In color image sensor 300, a white filter 342 is optically arranged in series with imaging element 302 and region 132 of light sensor 312. White filter 342 is so called because it transmits white light or other broad-spectrum light. In one embodiment, white filter 342 is an infra-red blocking filter that transmits the entire visible spectrum. In another embodiment, the white filter transmits red, green and blue spectral components. In another embodiment, the white filter additionally transmits near infra-red light to provide the ability to generate take pictures in the dark. White filter 342 transmits a substantially greater fraction of the light from the subject than any of filters 141, 142 and 143 that transmit narrow-band light, and can therefore increase the signal-to-ratio of the color image signal by as much as 12 dB.

The example of color image sensor 300 shown is suitable for use in applications that operate with less chrominance information than luminance information. Regions 131 and 133 of light sensor 312 on which images of the subject are formed in narrow-band light each have fewer, larger sensor elements than region 132 of the light sensor on which an image is formed in white light. In the example shown, the sensor element ratio is 1/4. Other sensor element ratios, such as 1/2, are possible. The regions may alternatively have equal numbers of sensor elements. Elements of image sensor 300 that correspond to elements of image sensor 100 described above with reference to FIG. 2 are indicated by the same reference numerals and will not be described again in detail.

In color image sensor 300, regions 131, 132 and 133 of light sensor 312 are equal in size, but sensor elements 321 and 323 in each of the regions 131 and 133, respectively, on which respective images are formed in narrow-band light more remote from to the center of the visible spectrum, i.e., red light and blue light, are fewer in number but larger in area than sensor elements 322 in region 132 on which an image is formed in white light, which is broader in wavelength range than the narrow band light. Color filters 141, 342 and 143 are all equal in size.

Imaging elements 101, 302 and 103 are equal in diameter and are all located the same distance from the major surface 316 of light sensor 312. Imaging element 302 differs from imaging elements 101 and 103 in that imaging element 302 forms an image on region 132 in polychromatic light. Imaging element 302 is therefore a multi-component, color corrected imaging element and is therefore greater in depth than imaging elements 101 and 103. Imaging element 302 is similar in structure to imaging element 14 described above with reference to FIG. 1, but is smaller in diameter (and, hence, depth) than imaging element 14 and is located closer to major surface 316 than imaging element is to major surface 16 because region 132 is smaller in linear dimensions than light detector 12 (FIG. 1). Thus, although color image sensor 300 is deeper than color image sensors 100, 150, 200 and 250 described above with reference to FIGS. 2-5, color image sensor 300 is still less deep than conventional color image sensor 10 described above with reference to FIG. 1. Moreover, for given sensor element area and construction, color image sensor 300 generates color image signal 314 with a substantially greater signal-to-noise ratio under low light conditions than conventional color image sensor 10.

As noted above, regions 131, 132 and 133 of light sensor 312 are equal in linear dimensions and area, but regions 131 and 133 have fewer sensor elements than region 132. This is similar to light sensor 212 of image sensor 200 described above with reference to FIG. 4. However, this is not critical to the invention: regions 131-133 may have equal numbers of equal-area sensor elements, as in color image sensor 100 described above with reference to FIG. 2. In another alternative, the sensor elements in regions 131, 132 and 133 are all equal in area, but regions 131 and 133 have fewer sensor elements than region 132, as in color image sensor 150 described above with reference to FIG. 3. In another alternative, the sensor elements in regions 131, 132 and 133 differ in area to equalize the spectral sensitivity of light sensor 312. In this case, regions 131 and 133 may have fewer sensor elements than region 132, as in color image sensor 250 described above with reference to FIG. 5, or regions 131, 132 and 133 may all have equal numbers of sensor elements, as mentioned above.

As noted above, the white light imaged by imaging element 302 on region 132 is full-spectrum white light or is white light composed of red, green and blue spectral components. As described above, a conventional color image sensor generates a color image signal using sensor elements that individually receive red, green or blue light. In such conventional color image sensor, the red, green and blue image signal components generated in response to the red, green and blue light, respectively, are summed to generate a luminance signal. Additionally, the red image signal component is subtracted from the luminance signal and the blue image signal component is subtracted from the luminance signal to generate respective color difference signals. The luminance signal and the color difference signals collectively constitute the color image signal.

In embodiments of color image sensor 300, the image signal component generated by region 132 on which imaging element 302 forms an image in white light provides a luminance signal, and the image signal components generated by regions 131 and 133 on which images are formed in red light and blue light, respectively, are up-sampled and are subtracted from the luminance signal provide respective color difference signals. The luminance signal and the color difference signals constitute color image signal 314. An embodiment of color image sensor 300 in which the white light is composed of red, green and blue spectral components generates color image signal 314 with a colorimetry that closely matches that of the color image signal generated by conventional color image sensor 10 shown in FIG. 1. An embodiment of color image sensor 300 in which the white light is full-spectrum white light generates color image signal 314 with a colorimetry that differs from that of the color image signal generated by the conventional color image sensor because region 132 generates the luminance signal in response to the full visible spectrum instead of in response to the red, green and blue spectral components of the visible spectrum. The difference in colorimetry will be acceptable for many applications.

In the embodiments of the color light sensor in accordance with the invention described above, the centers of the regions of the light sensor are located at the apices of a triangle. This minimizes the size of the portions of the regions that are juxtaposed and therefore minimizes the effects of light leakage from the image formed on each region to an adjacent region. The regions of the light sensor may alternatively be arranged in a straight line to reduce further the size of the color image sensor.

Figure 7:
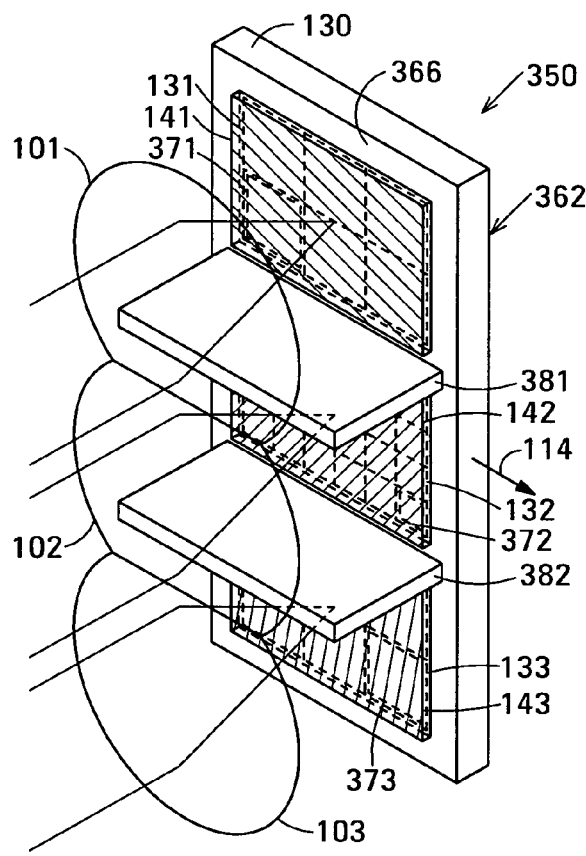
FIG. 7 is an isometric view of a highly simplified sixth embodiment of a color image sensor in accordance with the invention.

FIG. 7 is an isometric view of a highly-simplified sixth embodiment 350 of a color image sensor in accordance with the invention in which the regions of the light sensor are arranged vertically in a straight line. In this disclosure, the terms horizontal and vertical are used in their conventional video sense to denote the directions of the longer dimension and the shorter dimension, respectively, of the picture, rather than in any gravitationally-dependent sense. Color image sensor 350 is based on color image sensor 200 described above with reference to FIG. 4. Elements of color image sensor 350 that correspond to elements of the color image sensors described above with reference to FIGS. 2 and 4 are indicated using the same reference numerals and will not be described again here.

Image sensor 350 is composed of a light sensor 362 and imaging elements shown schematically at 101, 102 and 103. Light sensor 362 has sensor elements arranged on its major surface 366. Imaging elements are arranged to form images of the subject in light of different colors on major surface 366 in respective, vertically-arrayed regions 131, 132 and 133.

In the example of color image sensor 350 shown in FIG. 7, all the regions 131, 132 and 133 of light sensor 362 are equal in size, but the sensor elements 371 and 373 in regions 131 and 133, respectively, of the light sensor on which respective images are formed in light more remote from to the center of the visible spectrum, i.e., red light and blue light, are fewer in number but larger in area than sensor elements 372 in region 132 on which an image is formed in light closer to the center of the visible spectrum, i.e., green light. Sensor elements 371 in region 131 and sensor elements 373 in region 133 are larger in area than sensor elements 372 in region 132 in proportion to the reciprocal of the sensor element ratio and are larger in linear dimensions by approximately the square root of the reciprocal of the sensor element ratio. Imaging elements 101, 102 and 103 are equal in diameter and are all located the same distance from the major surface 366 of light sensor 362.

In color image sensor 350, regions 131 and 133 are juxtaposed with region 132 along their long sides. To prevent light leaking to an adjacent region from the image formed on each region of light sensor 362, color image sensor 350 is additionally composed of screens 381 and 382. The screens extend substantially orthogonally from the major surface 366 of light sensor 362 towards imaging elements 101-103. Screen 381 extends from light sensor 362 between region 131 and region 132, and screen 382 extends from light sensor 362 between region 133 and region 132. The screens are disposed parallel to the long sides of the regions. Although screens that are simply respective wafers of opaque material will prevent light leakage, screens in which the wafers additionally or alternatively have opposed light-absorbing major surfaces additionally prevent light incident on them from reflecting onto the adjacent region of light sensor 362 and causing ghosts and/or flares in the image formed on the region.

In the example of color image sensor 350 shown, regions 131, 132 and 133 of light sensor 362 are equal in linear dimensions and area, but regions 131 and 133 have fewer sensor elements than region 132 similar to light sensor 212 of image sensor 200 described above with reference to FIG. 4. However, this is not critical to the invention: regions 131, 132 and 133 may have equal numbers of equal-area sensor elements, as in color image sensor 100 described above with reference to FIG. 2. In another alternative, the sensor elements in regions 131, 132 and 133 are all equal in area, but regions 131 and 133 have fewer sensor elements than region 132, as in color image sensor 150 described above with reference to FIG. 3. In another alternative, the sensor elements in regions 131, 132 and 133 differ in area to equalize the spectral sensitivity of light sensor 362. In this case, regions 131 and 133 may have fewer sensor elements than region 132, as in color image sensor 250 described above with reference to FIG. 5, or the regions may have equal numbers of sensor elements, as mentioned above. Finally, color filter 142 may be a white filter similar to white filter 342 described above with reference to FIG. 6.

Figure 8:
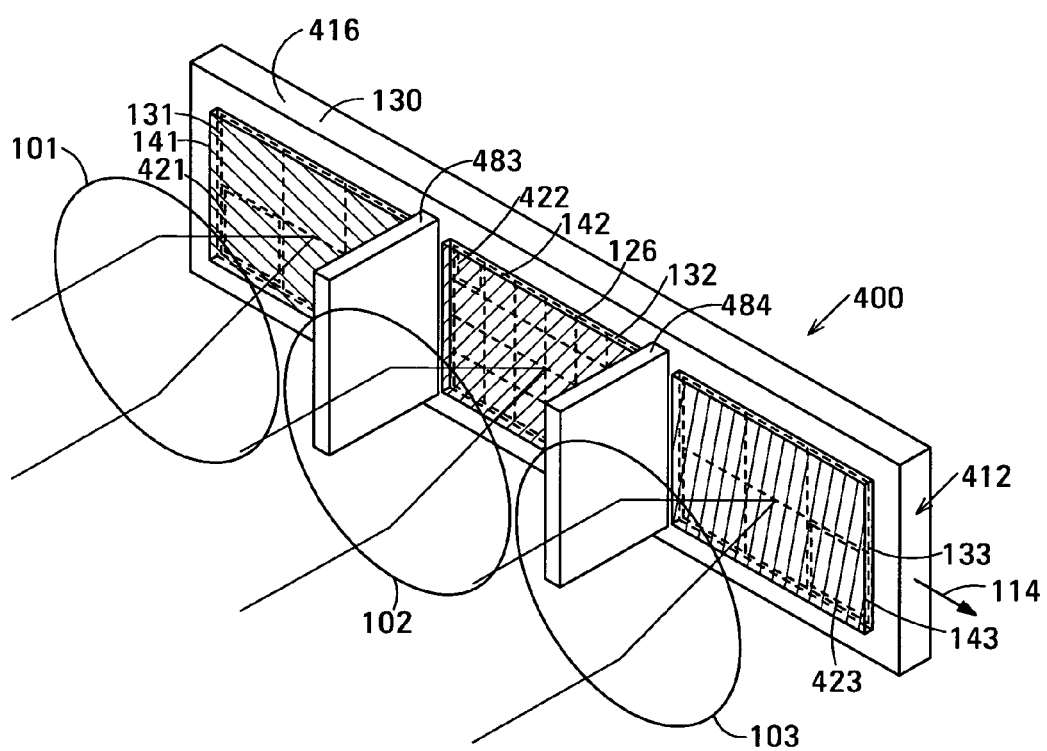
FIG. 8 is an isometric view of a highly simplified seventh embodiment of a color image sensor in accordance with the invention.

FIG. 8 is an isometric view of a highly-simplified seventh embodiment 400 of a color image sensor in accordance with the invention in which the regions of the light sensor are arranged horizontally in a straight line. Color image sensor 400 is based on color image sensor 200 described above with reference to FIG. 4. Elements of color image sensor 400 that correspond to elements of the color image sensors described above with reference to FIGS. 2 and 4 are indicated using the same reference numerals and will not be described again here.

Image sensor 400 is composed of a light sensor 412 and imaging elements shown schematically at 101, 102 and 103. Light sensor 412 has sensor elements arranged on its major surface 416. Imaging elements 101, 102 and 103 are arranged to form images of the subject on major surface 416 in respective, horizontally-arrayed regions 131, 132 and 133.

In color image sensor 400, regions 131 and 133 are each juxtaposed with region 132 along their short sides. To prevent light leaking from the image formed on each region to an adjacent region, color image sensor 400 is additionally composed of screens 483 and 484. Screen 483 extends from light sensor 412 between region 131 and region 132, and screen 484 extends from light sensor 412 between region 132 and region 133. Apart from their size and location relative to the regions of the light sensor, screens 483 and 484 are identical to screens 381 and 382 described above with reference to FIG. 7, and so will not be described further.

The size and number of sensor elements in the regions, the colors of the color filters and the configurations of the imaging elements may differ from those exemplified, as described above with reference to FIG. 7.

The above-described embodiments of the color image sensor in accordance with the invention have three imaging elements, each of which forms an image of the subject on the sensor elements in a respective region of the light sensor. However, the color image sensor may have more than three imaging elements each of which forms an image on the sensor elements in a respective region of the light sensor.

Figure 9:
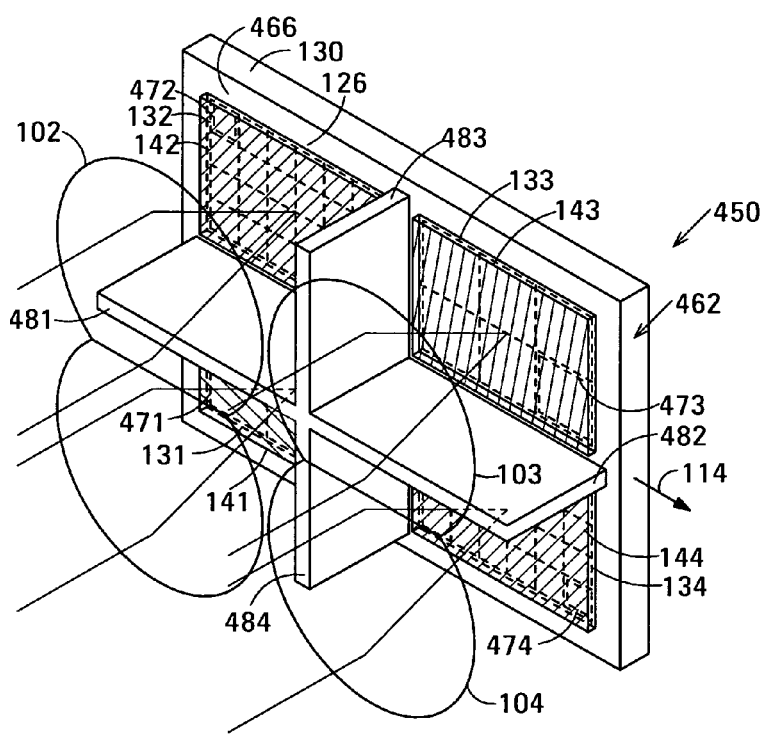
FIG. 9 is an isometric view of a highly simplified eighth embodiment of a color image sensor in accordance with the invention.

FIG. 9 is an isometric view of a highly-simplified eighth embodiment 450 of a color image sensor in accordance with the invention having four imaging elements. Each of the imaging elements forms an image of the subject on the sensor elements in a respective region of the light sensor in light of a respective color. In this embodiment, the centers of the regions are located at the corners of a rectangle. Color image sensor 450 is based on color image sensor 200 described above with reference to FIG. 4. Elements of color image sensor 450 that correspond to elements of the color image sensors described above with reference to FIGS. 2 and 4 are indicated using the same reference numerals and will not be described again here.

Image sensor 450 is composed of a light sensor 462 and imaging elements shown schematically at 101, 102, 103 and 104. Imaging elements 101, 102, 103 and 104 are arranged in a rectangular array to form respective images of the subject in light of different colors on regions 131, 132, 133 and 134, respectively, of light sensor 462. Color image sensor 450 is additionally composed of a color filter optically arranged in series with each of the imaging elements 101, 102, 103 and 104. In the example shown, color filters 141, 142, 143 and 144 are located on the major surface 466 of the light sensor over regions 131, 132, 133 and 134, respectively. Other locations of the color filters are possible, as described above.

In the example shown in FIG. 9, color filter 141 is a red filter that transmits red light to region 131 of light sensor 462, color filter 142 is a green filter that transmits green light to region 132, color filter 143 is a blue filter that transmits blue light to region 133 and color filter 144 is a green filter that transmits green light to region 134. The green color filters are located diagonally opposite one another, as are the red and blue color filters. In other embodiments, the colors of color filters 141, 142, 143 and 144 are different from those described. In one example, color filter 144 is a white filter, similar to white filter 342 described above with reference to FIG. 6. In such an embodiment, region 134 generates a luminance signal in response to the image formed thereon in white light, and regions 131, 132 and 133 generate red, green and blue image signal components, respectively, in response to images formed thereon in red, green and blue light, respectively.

In color image sensor 450, all the regions 131, 132, 133 and 134 of light sensor 462 are equal in size, but the sensor elements 471 and 473 in each of the regions 131 and 133 of the light sensor on which respective images are formed in light more remote from to the center of the visible spectrum, i.e., red light and blue light, are fewer in number but larger in area than sensor elements 472 in region 132 of the light sensor on which an image is formed in light closer to the center of the visible spectrum, i.e., green light, and than sensor elements 474 in region 134 in which an image is formed in light either closer to the center of the visible spectrum, i.e., green light, or broader in wavelength range, i.e., white light. Sensor elements 471 in region 131 and sensor elements 473 in region 133 are larger in area than sensor elements 472 in region 132 and than sensor elements 474 in region 134 in proportion to the reciprocal of the sensor element ratio and are larger in linear dimensions by approximately the square root of the reciprocal of the sensor element ratio. Imaging elements 101, 102, 103 and 104 are equal in diameter and are all located the same distance from the major surface 466 of light sensor 462.

In an alternative embodiment of color image sensor 450 in which color filter 144 is a white filter, the sensor elements in region 132 may be similar to those in regions 131 and 133 in terms of number and size.

In color image sensor 450, regions 131 and 132 and regions 133 and 134 are juxtaposed along their long sides, and regions 132 and 133 and regions 131 and 134 are juxtaposed along their short sides. To prevent light leaking to an adjacent region from the image formed on each region of light sensor 462, color image sensor 450 is additionally composed of screens 481, 482, 483 and 484. The screens extend substantially orthogonally from the major surface 466 of light sensor 462 towards imaging elements 101-104. Screen 481 extends from light sensor 462 between region 131 and region 132, screen 482 extends from light sensor 462 between region 133 and region 134, screen 483 extends from light sensor 462 between region 132 and region 133 and screen 484 extends from light sensor 462 between region 131 and region 134. Screens 481 and 482 are disposed parallel to the long sides of the regions and screens 483 and 484 are disposed parallel to the short sides of the regions. Although screens that are simply respective wafers of opaque material will prevent light leakage, screens in which the wafers additionally or alternatively have opposed light-absorbing major surfaces additionally prevent light incident on them from reflecting onto the adjacent region of light sensor 462 and causing ghosts and/or flares in the image formed on the region.

In color image sensor 450, regions 131, 132, 133 and 134 of light sensor 462 are equal in linear dimensions and area, but regions 131 and 133 have fewer sensor elements than regions 132 and 134, similar to light sensor 212 of image sensor 200 described above with reference to FIG. 4. However, this is not critical to the invention: all four regions may have equal numbers of equal-area sensor elements, similar to color image sensor 100 described above with reference to FIG. 2. In another alternative, the sensor elements in regions 131, 132, 133 and 134 are all equal in area, but regions 131 and 133 have fewer sensor elements than regions 132 and 134, similar to color image sensor 150 described above with reference to FIG. 3. In another alternative, the sensor elements in regions 131, 132, 133 and 134 differ in area to equalize the spectral sensitivity of the regions of light sensor 462. In this case, regions 131 and 133 may have fewer sensor elements than regions 132 and 134, similar to color image sensor 250 described above with reference to FIG. 5, or the regions may have equal numbers of sensor elements, as mentioned above. Finally, color filter 144 may be a white filter similar to white filter 342 described above with reference to FIG. 6. In this case, regions 131, 132 and 133 may have fewer sensor elements than region 134.

The above-described embodiments of the color image sensor in accordance with the invention have three or four imaging elements, each of which forms an image on the sensor elements in a respective region of the light sensor. However, using more than four imaging elements, each of which forms an image on the sensor elements in a respective region of the light sensor, provides additional advantages. Having more imaging elements and respective regions of sensor elements than the minimum number needed to generate the three image signal components of a color image signal provides easier correction for defective sensor elements and helps avoid occlusions.

FIGS. 10A-10D show examples of some multi-region arrangements of the sensor elements on a highly-simplified example of a light sensor 512 suitable for use with a respective number of imaging elements in the color image sensors described above.

Figure 10A:
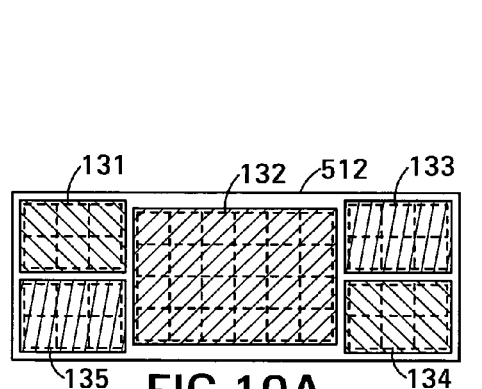
FIGS. 10A-10D show examples of some multi-region arrangements of the sensor elements on a highly-simplified example of the light sensor.
Figure 10B:
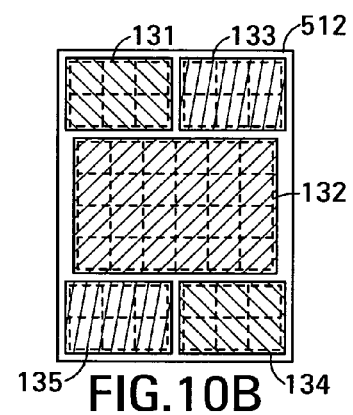
Figure 10C:
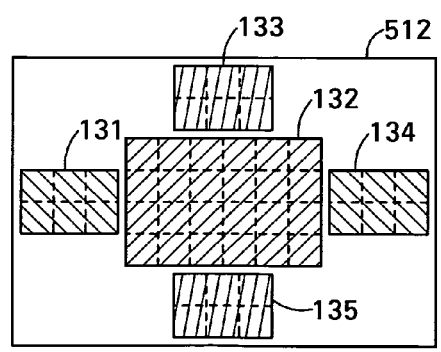

In the examples of light sensor 512 shown in FIGS. 10A, 10B and 10C, the sensor elements are arranged in five regions 131, 132, 133, 134 and 135, each of which has its own color filter (indicated by hatching) and imaging element (not shown). In the examples shown, the sensor elements are all of the same size, although this is not critical to the invention. In the examples shown, region 132 has four times as many sensor elements as each of the remaining regions and has an image formed on it in light closer to the center of the visible spectrum or broader in wavelength range than the light in which images are formed on the remaining regions. In the examples shown, an image is formed on region 132 in green light, images are formed on regions 131 and 134 in red light and images are formed on regions 133 and 135 in blue light. The image formed on region 132 may alternatively be in white light, as described above.

In the example shown in FIG. 10A, a region pair composed of vertically-arrayed regions 131 and 135, region 132 and a region pair composed of vertically-arrayed regions 133 and 134 are arrayed in order horizontally. In the example shown in FIG. 10B, a region pair composed of horizontally-arrayed regions 131 and 133, region 132 and a region pair composed of horizontally-arrayed regions 135 and 134 are arrayed in order vertically. In the example shown in FIG. 10C, regions 131, 132 and 134 are arrayed in order horizontally and regions 133, 132 and 135 are arrayed in order vertically.

Figure 10D:
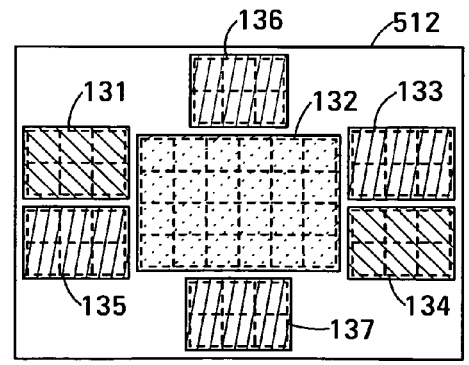
Figure 11A:
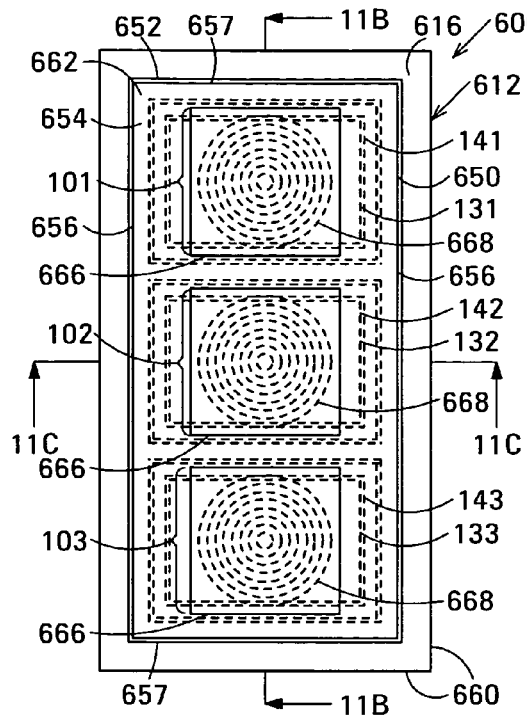
FIGS. 11A-11D are respectively a plan view, two orthogonal cross-sectional views and an isometric view of a ninth embodiment of a color image sensor in accordance with the invention.
Figure 11B:
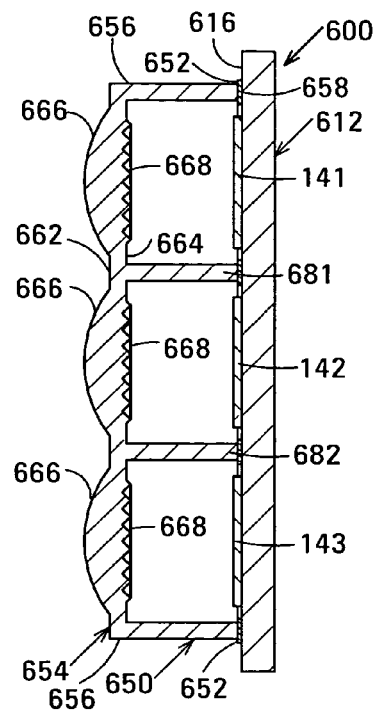
Figure 11C:
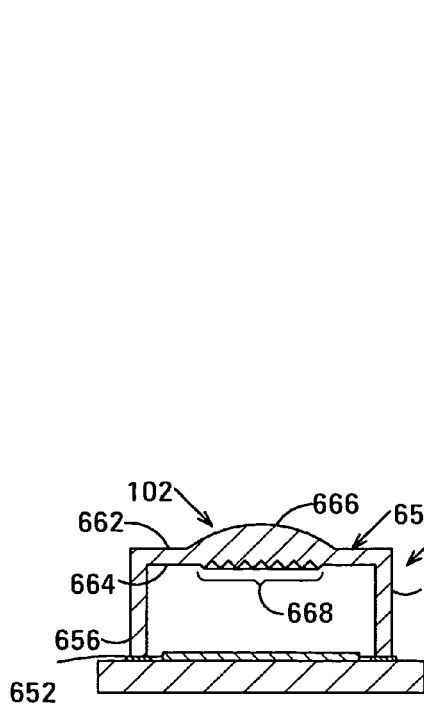
Figure 11D:
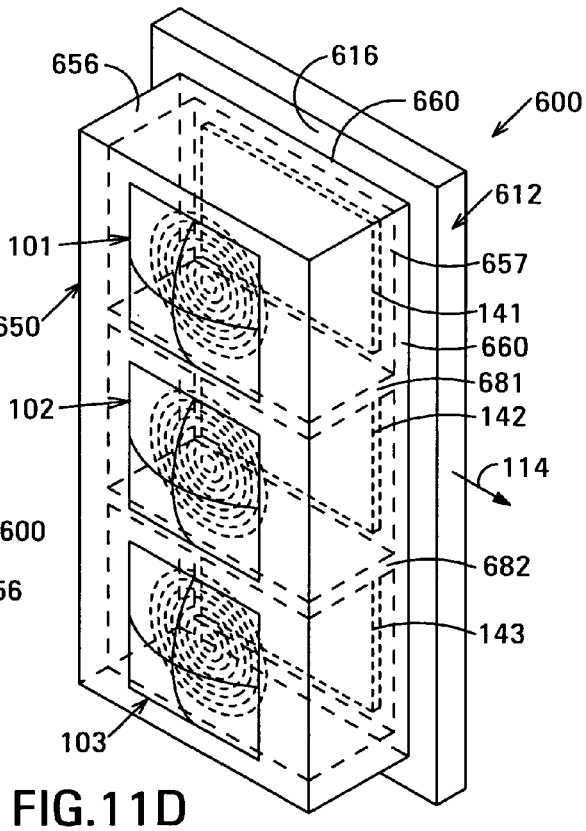

In the example of light sensor 512 shown in FIG. 10D, the sensor elements are arranged in seven regions. Regions 131-135 are as described above and are arranged as described above with reference to FIG. 10A. Region 136, region 132 and region 137 are vertically arrayed. Each of regions 136 and 137 has a green color filter (indicated by hatching). A respective imaging element (not shown) forms an image on each of regions 136 and 137 in green light. In the example shown, the sensor elements are all of the same size, although this is not critical to the invention. In the example shown, an image is formed on region 132 in light broader in bandwidth than the light in which images are formed on the remaining regions.

In each of the examples shown in FIGS. 10A-10D, each of the regions of light sensor 512 generates an image signal component in response to the image formed thereon. An error detection and correction circuit (not shown) examines the image signal components for portions generated by defective sensor elements. Processes to detect such signal portions are known in the art and will not be described in detail. Typically, such processes detect portions of each image signal component that are out of range relative to corresponding portions of the other image signal components, or relative to portions of the same image signal component generated by adjacent sensor elements. In the examples of light sensor 512 just described, since there are two image signal components generated in response to images formed in red light and two image signal components generated in response to images formed in blue light, the error correction circuit uses the image signal components generated in response to images in the same color to detect defective sensor elements and replaces a signal portion originating at a defective sensor element in one region with the signal portion originating at the sensor element located at a corresponding position in the other region on which the image is formed in the same color.

For a signal portion originating at a defective sensor element in region 132 in the examples shown in FIGS. 10A-10C, the error correction circuit synthesizes a replacement signal portion from portions of the image signal component originating at neighboring sensor elements in region 132. Additionally or alternatively, the error correction replaces the signal portion originating at the defective sensor element with portions of the image signal components originating at sensor elements located at corresponding positions in the other regions. For a signal portion originating from a defective sensor element in region 132 of the example shown in FIG. 10D, the error correction circuit synthesizes a replacement signal portion by summing portions of the image signal components originating at sensor elements located at corresponding positions in the other regions.

In embodiments of a color image sensor in accordance with the invention, the imaging elements are laterally offset from one another. As a result, one or more portions of the subject that appear in the image formed on region 132 can be obscured by other portions of the subject in the image formed on one or more others of the regions. The color image signal generated by the three-region embodiments described above will lack full color information for the obscured portions of the subject. The five- and seven-region embodiments shown in FIGS. 10A-10D avoid this problem by locating the regions on which images are formed in light of the same color on opposite sides of region 132.

For example, referring to FIG. 10A, a portion of the subject whose image is formed in green light in region 132 but that is obscured in the image formed in red light on region 131 will typically be present in the image formed in red light on region 134 since region 134 is vertically and horizontally offset from region 131. An auxiliary circuit (not shown) that forms part of light sensor 512, or is external to light sensor 512 combines the image signal components generated in response to images formed in red light on regions 131 and 134 to generate a virtual red image signal component that emulates an image formed in red light on region 132. Similarly, the auxiliary circuit combines the image signal components generated in response to images formed in blue light on regions 133 and 135 to generate a virtual blue image signal component that emulates an image formed in blue light on region 132. Obscuration in the red and blue virtual image signal components is substantially the same as in the green image signal component. Accordingly, in some embodiments, the virtual red and blue image signal components can be summed with the green image signal component generated by region 132 to generate a luminance signal and can be up-sampled and subtracted from the luminance signal to generate color difference signals. The luminance signal and the color difference signals collectively constitute the color image signal 114 generated by light sensor 512.

As described above, the sizes of the sensor elements and their number in each of the regions can be different from those exemplified in the above description of FIGS. 10A-10D.

In the above-described embodiments of the color image sensor in accordance with the invention, the imaging elements such as imaging elements 101-103 are depicted schematically to simplify the drawings. Conventional imaging elements can be used as the imaging elements in the described embodiments. As noted above, smaller size of the largest region of sensor elements in the light sensor allows a color image sensor in accordance with the invention to use smaller conventional imaging elements located closer to the major surface of the light sensor than a conventional color image sensor. Moreover, those conventional imaging elements that form an image in narrow-band light can be constructed using fewer components, and can therefore be even smaller, than a conventional color image sensor.

Another embodiment of a color image sensor in accordance with the invention incorporates a simple molded array of imaging elements instead of the smaller, simpler conventional imaging elements just described. FIGS. 11A-11D are respectively a plan view, two orthogonal cross-sectional views and an isometric view of a ninth embodiment 600 of a color image sensor in accordance with the invention. Color image sensor 600 incorporates a simple, molded imaging element array 650 that additionally encapsulates the sensor elements located on the major surface 616 of light sensor 612. Imaging element array 650 is not only small and inexpensive to manufacture, it can also be assembled with light sensor 612 using wafer-scale assembly. In other words, a single alignment and attachment process can be used to affix a imaging element array 650 simultaneously to each of all the light sensors fabricated in a silicon wafer before the silicon wafer is singulated into individual color image sensors. Although the example of color image sensor 600 shown in FIGS. 11A-11D is based on color image sensor 350 described above with reference to FIG. 7, it will be apparent that imaging element array 650 can easily be configured for installation on any of the embodiments described above. Elements of color image sensor 600 that correspond to elements of the color image sensors described above with reference to FIGS. 2 and 7 are indicated using the same reference numerals and will not be described again here.

Color image sensor 600 is composed of light sensor 612 imaging element array 650 affixed to the major surface of light sensor 612. Light sensor 612 is similar to light sensor 362 described above with reference to FIG. 7. Light sensor 612 has sensor elements (not shown to simplify the drawing, but see FIG. 7) arranged on its major surface 616. The sensor elements are located in vertically-arrayed regions 131, 132 and 133 of light sensor 612. Also mounted on major surface 616 of light sensor 612 are color filters 141, 142 and 143 covering regions 131, 132 and 133, respectively. Also located on major surface 616 of light sensor 612 is annular pad 652 to which imaging element array 650 is affixed.

Imaging element array 650 has the basic shape of a rectangular, partitioned, open-bottomed box and is composed of an optical substrate 654, long side pieces 656 and short side pieces 657. The side pieces extend substantially orthogonally from the optical substrate to a form a plane mounting surface 658 that abuts and is affixed to pad 652. The height of the side pieces sets the spacing between imaging elements 101, 102 and 103 that are part of imaging element array 650 and major surface 616. The spacing typically locates the imaging elements so that they focus parallel light at major surface 616. In one embodiment, the sides set the optical substrate about 2 mm from major surface 616.

Optical substrate 654 is shaped to define imaging elements 101, 102 and 103. Imaging elements 101-103 have positions in optical substrate 654 that are accurately defined relative to one another and, in an embodiment, are additionally accurately defined relative to the external major surfaces 660 of at least two adjacent ones of long side pieces 656 and short side pieces 656. Imaging elements 101, 102 and 103 are spaced from one another on optical substrate 654 such that their optical axes are separated by a distance equal to the distance between the centers of regions 131-133 of light sensor 612. The accurately-defined positioning of the imaging elements relative to external major surfaces 660 enables imaging elements 101-103 to be accurately located relative to regions 131-133 of light sensor 612 during assembly by accurately aligning external major surfaces 660 relative to light sensor 612.

Optical substrate 654 has two, opposed major surfaces, external major surface 662 and internal major surface 664. In the example shown, convex, spherical refractive surfaces 666 are defined in external major surface 662 and diffractive correction elements 668 are defined in internal major surface 664 each axially aligned with a respective one of refractive surfaces 666. Each of imaging elements 101, 102 and 103 is composed of one of the refractive surfaces 666 and the one of correction elements 668 axially aligned therewith.

In the example shown, each of the refractive surfaces 666 is spherical. A spherical surface is easy to mold accurately, but suffers from spherical aberration. The diffractive correction element 668 axially aligned with the refractive surface is structured to correct the spherical aberration of the refractive surface aligned therewith.

Refractive surfaces 666 differ from one another in radius of curvature since each forms an image in light of a different color. Similarly, the features of diffractive correction elements 668 differ in from one another in size since each of the diffractive correction elements corrects the spherical aberration of the adjacent spherical refractive element in light of a different color. Thus, the optical properties of imaging elements 101, 102 and 103 are optimized for red, green and blue light respectively.

Screens 681 and 682 extend between long sides 656 parallel to short sides 657 and divide the basic rectangular box shape of imaging element array 650 into three sections. Each of the sections accommodates one of the regions 131, 132 and 133 of the sensor elements of light sensor 612. The screens have light-absorbent surfaces that prevent light leakage between the regions, as described above.

Figure 12A:
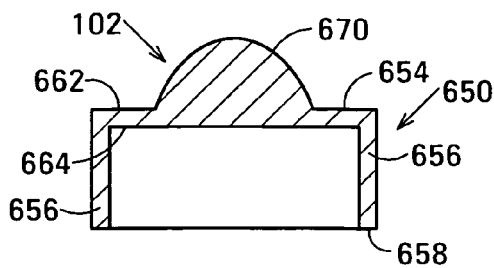
FIGS. 12A-12C are cross-sectional views of three alternative embodiments of the imaging element array shown in FIGS. 11A-11D.

FIG. 12A is a cross-sectional view of an alternative embodiment of imaging element array 650, and, specifically, of imaging element 102. The other imaging elements in the imaging element array are similar in structure. In this embodiment, convex, aspherical refractive surface 670 is defined in external major surface 662 of optical substrate 654 and internal major surface 664 is plane. In this embodiment of imaging element array 650, each of imaging elements 101, 102 and 103 is composed of a single refractive surface similar to refractive surface 670. An optical design program is typically used to define properties of refractive surface 670 of each imaging element 101, 102 and 103 that provide the imaging element with its specified imaging properties and that additionally minimizes spherical aberration in light of the color in which the imaging element forms an image.

Figure 12B:
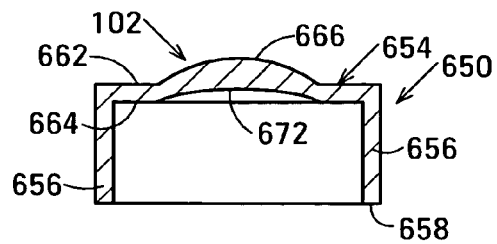

FIG. 12B is a cross-sectional view of another alternative embodiment of imaging element array 650, and, specifically, of imaging element 102. The other imaging elements in the imaging element array are similar in structure. In this embodiment, convex, spherical refractive surface 666 is defined in external major surface 662 of optical substrate 654 and concave, aspherical refractive surface 672 is defined in internal major surface 664. Aspherical refractive surface 672 corrects the spherical aberration of spherical refractive surface 666. In this embodiment of imaging element array 650, each of imaging elements 101, 102 and 103 is composed of two opposed refractive surfaces similar to refractive surfaces 666 and 672.

In imaging elements 101, 102 and 103, refractive surfaces 666 differ from one another in radius of curvature and refractive surfaces 672 differ from one another in radius of curvature since each pair of refractive surfaces forms an image in light of a different color. Thus, the optical properties of imaging elements 101, 102 and 103 are optimized for red, green and blue light respectively. An optical design program is typically used to define properties of refractive surfaces 666 and 672 of each imaging element 101, 102 and 103 that provide the imaging element with it specified imaging properties and additionally minimizes spherical aberration in light of the color in which the imaging element forms an image.

Figure 12C:
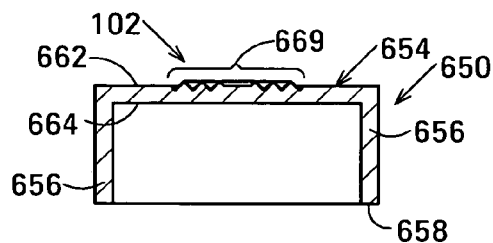

FIG. 12C is a cross-sectional view of another alternative embodiment of imaging element array 650, and, specifically, of imaging element 102. The other imaging elements in the imaging element array are similar in structure. In this embodiment, diffractive element 669 is defined in external major surface 662 of optical substrate 654 and internal major surface 664 is plane. In this embodiment of imaging element array 650, each of imaging elements 101, 102 and 103 is composed of a single diffractive similar to diffractive element 669. An optical design program is typically used to define properties of diffractive element 669 of each imaging element 101, 102 and 103 that provide the imaging element with its specified imaging properties and that additionally minimizes aberrations in light of the color in which the imaging element forms an image.

Figure 12D:
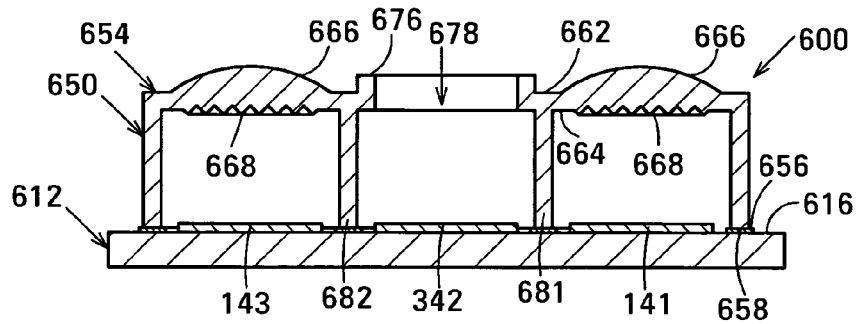
FIGS. 12D-12E are cross-sectional views of two alternative embodiments of the color image sensor shown in FIGS. 11A-11D.

FIG. 12D is a cross-sectional view of an alternative embodiment of color image sensor 600 shown in FIGS. 11A-11D and, in particular, an alternative embodiment in which imaging element array 650 provides a mount for a conventional imaging element that forms an image on region 132 of light sensor 612 in white light. In this embodiment, image sensor array 650 has no imaging element aligned with region 132 on which the image is formed in white light. Instead, that portion of the imaging element array defines a mount 676 for a conventional multi-component imaging element (not shown) and additionally defines an aperture 678 for light to pass through optical substrate 654 from the multi-component imaging element to region 132 of the light sensor.

Figure 12E:
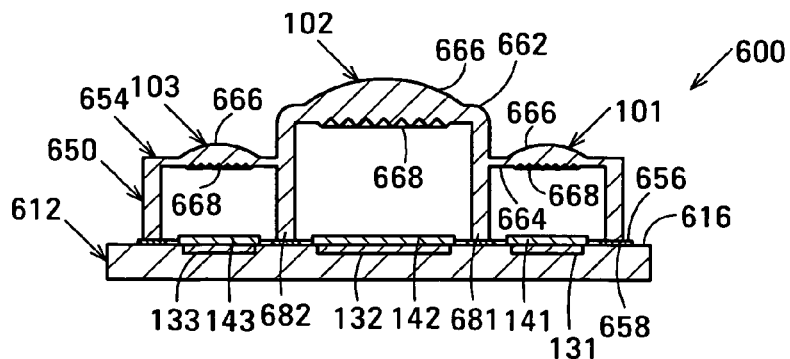

FIG. 12E is a cross-sectional view of another alternative embodiment of color image sensor 600 shown in FIGS. 11A-11D and, in particular, an embodiment in which imaging elements 101 and 103 and imaging element 102 are located at different distances from major surface 616 of light sensor 612. In this embodiment, regions 131 and 133 of light sensor 612 differ in area from region 132. In imaging element array 650, optical substrate 654 is stepped to locate imaging elements 101 and 103 and imaging element 102 at different distances from major surface 616. Imaging elements 101-103 defined in optical substrate 654 additionally differ in size.

Imaging element array 650 is molded as a single piece in a suitable plastic material. Desirable properties of the plastic material used to mold imaging element array 650 include hardness, low haze, low dispersion, homogeneous refractive index distribution, low coefficient of thermal expansion, low sensitivity to humidity, low water absorption, high optical transmittance in visible light, high impact resistance and low birefringence. Suitable materials include polycarbonates, acrylics (PMMA), polystyrene, polyolefins, NAS and Optores. Specific materials include a norbonene copolymer with an ester side chain sold by JSR Corp, Tokyo 104, Japan under the trademark Arton® F.

In an embodiment, image element array 650 is molded in a co-polycarbonate material sold under the trademark APEC® by Bayer A.G. of Leverkusen, Germany. Some types of this material are capable of withstanding typical soldering temperatures, which allows imaging element array 650 to be affixed to light sensor 612 by a reflow solder process. Polycarbonate is regarded in the art as not having ideal optical properties, but the optical properties of polycarbonate are good enough for this application in which the components of imaging elements 101, 102 and 103 are all individually designed to optimize their optical characteristics for the narrow-band light in which they each form an image.

After molding, diffractive correcting elements 668 are masked and light-absorbing material is applied to the internal surfaces of the imaging element array. The light absorbing material ensures that only light imaged by imaging elements 101-103 is incident on light sensor 612 and additionally renders screens 681 and 682 light-absorbing.

Imaging element array 650 can alternatively be fabricated from piece parts, although doing so loses much of the low production cost and high dimensional accuracy and repeatability that can be obtained from a unitary molded part. Alternatively, the imaging element array may be molded without screens 681 and 682 and screens of a different, light-absorbing material may be installed later. The alignment of the screens is less critical.

Figure 13:
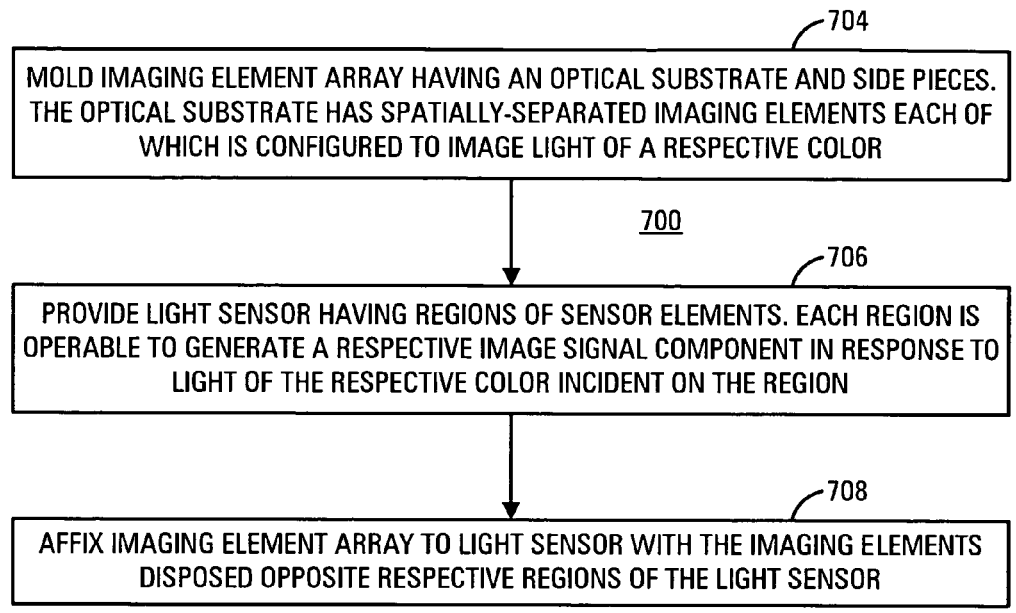
FIG. 13 is a flow chart illustrating an embodiment of a method in accordance with the invention for making a color image sensor.

FIG. 13 is a flow chart illustrating an embodiment of a method 700 in accordance with the invention for making a color image sensor.

In block 704, an imaging element array having an optical substrate and side pieces is molded. The optical substrate includes spatially-separated imaging elements, each of which is configured to image light of a respective color.

In block 706, a light sensor having regions of sensor elements is provided. Each of the regions is operable to generate a respective image signal component in response to light of the respective color incident on the region.

In block 708, the imaging element array is affixed to the light sensor with the imaging elements disposed opposite respective regions of the light sensor.

In one embodiment of the method, the imaging element array is affixed to the light sensor by solder.

In another embodiment of the method, hundreds of light sensors 612 are fabricated in an array on a silicon wafer, and hundreds of imaging element arrays 650 are molded in a matrix equal in size and approximately equal in dimensions to the array of light sensors fabricated on the silicon wafer. Such silicon wafers typically range in diameter from about 150 mm to about 300 mm. The matrix of imaging element arrays is molded to include flexible plastic filaments that interconnect each imaging element array to its neighbors. Interconnecting the imaging element arrays in the matrix greatly facilitates handling the imaging element arrays since it allows the imaging element arrays to be handled as a single unit. The spacing between neighboring imaging element arrays in the matrix approximates that between the light sensors on the wafer.

The matrix of imaging element arrays is loaded into a jig that defines recesses into which the imaging element arrays fit snugly and that engage accurately with at least the two adjacent sidepieces of each imaging element array. The sidepieces are those with respect to which the positions of the imaging elements are defined. The spacing between neighboring recesses in the jig accurately matches that between neighboring light sensors on the wafer.

An alignment operation is performed to align the jig precisely with reference marks on the wafer. This single alignment operation precisely aligns all the imaging element arrays with their respective light sensors. The wafer and jig assembly is then heated to melt solder applied to pad 652 on the major surface of each light sensor. The assembly is then allowed to cool. Once the solder solidifies, it affixes the imaging element arrays to their respective light sensors. The jig is then detached from the imaging element arrays and the assembly of light sensors and imaging element arrays is singulated into individual color image sensors using a conventional singulation process. This assembly method is based on that disclosed by Ertel et al. in U.S. patent application Ser. No. 10/402,721, assigned to the assignee of this disclosure and incorporated herein by reference. Other wafer-scale or individual assembly processes may alternatively be used.

The above-described embodiments of the color image sensor in accordance with the invention generate a color image signal in response to the images formed on the light sensor by the respective imaging elements. To minimize color errors in a picture displayed in response to the color image signal, corresponding portions of the color image signal should represent the same portion of the subject. If the images formed on the regions of the light sensor are differently located relative to the (0,0) sensor element of the region, color errors can occur in the picture. A difference in the position of the image relative to the (0,0) sensor element between two or more of the regions will be called image misalignment. The (0,0) sensor element of a region is the sensor element at which the raster-scan read out of the electrical values generated by sensor elements in the region begins.

Two main factors contribute to image misalignment: manufacturing misalignment and parallax misalignment. Manufacturing misalignment is principally caused by alignment errors between the imaging elements and the respective regions of the light sensor in manufacture. Parallax misalignment is principally caused by the spatial separation of the imaging elements.

Using a one-piece imaging element array such as that described above with reference to FIGS. 11A-11D will minimize manufacturing misalignment. The one-piece imaging element array significantly reduces manufacturing misalignment caused by errors in the distances between the individual imaging elements. Moreover, a positional alignment error between the imaging element array and the light sensor is manifested as equal positional errors in the images formed on all the regions of the light sensor and so produces minimal image misalignment. However, a rotational alignment error between the imaging element array and the light sensor will typically manifest itself as a difference in the locations of the images on the respective regions of the light sensor, and so may produce image misalignment.

Figure 14:
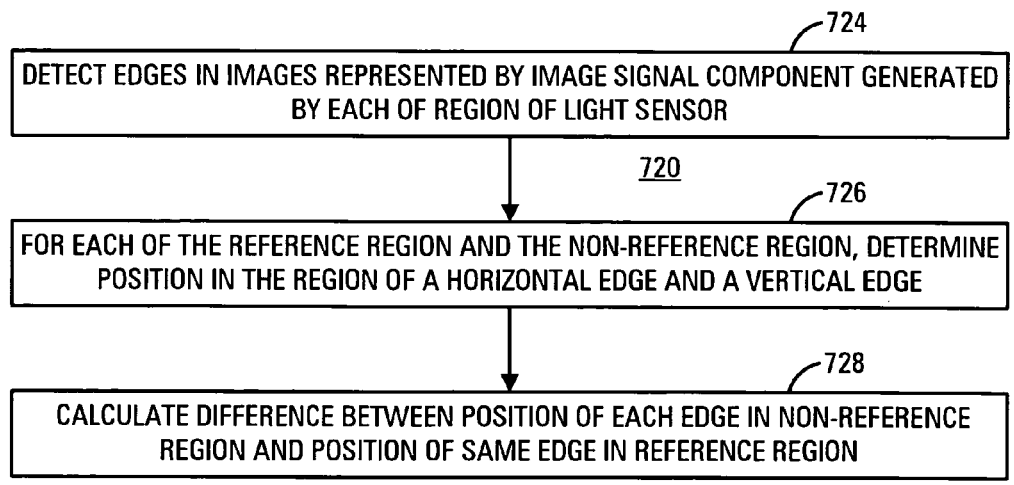
FIG. 14 is a flow chart illustrating an embodiment of a misalignment measurement routine that can be used to measure manufacturing misalignment or parallax misalignment.

A misalignment measurement routine 720 that can be used to measure manufacturing misalignment or parallax misalignment will now be described with reference to FIG. 14. This description and the description below of misalignment mitigation will describe measuring and mitigating misalignment between two of the regions of the light sensor. One of the regions is designated as a reference region and the other is designated a non-reference region. The region on which an image is formed in light closer to the center of the visible spectrum or broader in wavelength range, e.g., region 132 in FIG. 2, is typically designated as the reference region. It will be apparent that the processes described herein can be applied to measure and mitigate misalignment between the reference region and one or more other non-reference regions and/or among non-reference regions.

In block 724, edges are detected in the images represented by the image signal components generated by the regions of the light sensor. Algorithms for detecting edges in images represented by video signals are known in the art. More accurate results are obtained by detecting both horizontal edges and vertical edges. In embodiments of the misalignment measurement process in which the images are images of a known test pattern, a simpler edge detection algorithm can be used because the approximate position of the edges is known.

In block 726, for each of the reference region and the non-reference region, the position therein of a horizontal edge and a vertical edge relative to a reference point is determined. The position of each edge relative to the (0,0) sensor element of the region may be determined for example. Optionally, the position of more than one edge of each type may be determined.

In block 728, the difference between the position of each edge in the non-reference region and the position of the same edge in the reference region is calculated to quantify the image misalignment between the non-reference region and the reference region vertically and horizontally.

In embodiments of the color image sensor in accordance with the invention that have misalignment mitigation, the non-reference region has more rows and columns of sensor elements than the number of rows and columns corresponding to the reference region, i.e., more than the same number of rows and columns in an embodiment similar to FIG. 2 or more than a fraction of the number of rows and columns in an embodiment similar to FIG. 3. The (0,0) sensor element of the non-reference region is initially located one or more columns to the right and one or more rows down from the top, left-hand sensor element in the region.

Manufacturing misalignment is mitigated by performing an alignment process during manufacture of the color image sensor. In the alignment process, the color image sensor subject to alignment is illuminated with parallel light from a test pattern and misalignment measurement routine 720 described above is performed to measure the vertical and horizontal components of the image misalignment between the non-reference region and the reference region. The test pattern has clear, sharp vertical and horizontal edges in polychromatic light to optimize the precision of the alignment process and to ensure that an image is formed on each region of the light sensor. The image misalignment is expressed in terms of rows and columns of the non-reference region and has an integer portion and a fractional portion. A rounding operation is performed to generate a rounded image misalignment. The sensor element designated as the (0,0) sensor element of the region is then shifted by the inverse of the rounded image misalignment.

In an example, in color image sensor 100 described above with reference to FIG. 2, the image misalignment of the image formed by imaging element 101 on region 131 in red light relative to the image formed by imaging element 102 on reference region 132 in green light is +1.3 row and −1.9 columns, which rounds to +1 row and −2 columns. In this case, the sensor element designated as the (0,0) sensor element of region 131 is shifted by −1 row and +2 columns relative to the position of the (0,0) sensor element when the routine 720 was performed. The routine 720 may be performed again with the new position of the (0,0) sensor element to verify that the image misalignment of region 131 is now less than one row and one column.

After the new location of the (0,0) sensor element in the non-reference region has been determined, color image sensor 100 stores in non-volatile memory data indicating the location of the (0,0) sensor element in the non-reference region. In normal operation of color image sensor 100, the read-out circuit (not shown) of the non-reference region refers to the non-volatile memory at least at power on to determine the location of the (0,0) sensor element of the region. The read-out circuit then reads out the number of rows and columns of sensor elements corresponding to the full image size, starting at the (0,0) sensor element. For example, an embodiment of color image sensor 100 that generates a color image signal representing a 1024×768-pixel image reads out 1024 sensor elements in each row and 768 rows of sensor elements in each region of the light sensor to produce the color image signal. This number of sensor elements and rows of sensor elements is read out from each region regardless of the location of the (0,0) sensor element in the region. In some embodiments, no more than the above-described coarse misalignment mitigation process is performed.

In other embodiments, auxiliary circuit 128 includes a circuit that performs interpolation processing that can provide a more precise mitigation of manufacturing misalignment than that just described during normal operation of the color image sensor. In such embodiment, the coarse misalignment mitigation process just described is performed to mitigate the manufacturing misalignment to less than the size of one sensor element. The auxiliary circuit performs fine misalignment mitigation that further mitigates manufacturing misalignment by generating, during normal operation of the color image sensor, an interpolated value for each sensor element in the non-reference region. The interpolated value for each sensor element is generated from the raw electrical values generated by the sensor element and its three immediate neighbors using weights determined using the fractional portion of the misalignment measured by routine 720, as described above.

In such an embodiment, the above-described alignment process is performed and the location of the (0,0) sensor elements are shifted. Additionally, the difference between the measured image misalignment and the rounded image misalignment is calculated to provide a first row weight and a first column weight. The first weights are each subtracted from unity to provide a second row weight and a second column weight. The four weights are stored in the above-mentioned non-volatile memory for use during normal operation of the color image sensor. In the above example, the row weights are 0.3 and 0.7 and the column weights are 0.1 and 0.9.

The raw electrical values generated by the sensor elements in the region can be regarded as values of respective pixels of an original image, and the interpolated values can be regarded as values of respective pixels of an interpolated image. The interpolated image can be regarded as overlaying the original image but as being offset from the original image by an offset equal to the difference between the measured image misalignment and the rounded image misalignment. Moreover, each pixel of the interpolated image can be regarded as overlaying up to four pixels of the original image.

During normal operation of the color image sensor, the auxiliary circuit calculates an interpolated value for each pixel of the interpolated image from the pixel values of the up to four pixels of the original image overlaid by the interpolated image pixel using the weights stored in the non-volatile memory. The original image pixel values are the raw electrical values provided by the corresponding sensor elements. This type of interpolation is known in the art and will therefore not be described in further detail. The interpolated values are output as the image signal component of the region. Other interpolation techniques are known and can be used instead.

Further mitigation of the manufacturing misalignment can be obtained by performing mapped misalignment mitigation. In this, a test pattern having a grid of polychromatic horizontal and vertical lines is used and misalignment measurement routine 720 is run to measure a misalignment at each of multiple locations in the image. An average image misalignment is calculated from the misalignment measurements generated by routine 720, the average misalignment is rounded and the location of the (0,0) sensor element of the non-reference region is shifted by the inverse of the rounded average misalignment. The rounded average misalignment is stored in non-volatile memory.

A row difference and a column difference are calculated between each measured image misalignment and the rounded average misalignment to provide respective first row weights and first column weights. The first weights are subtracted from unity to generate respective second row weights and second column weights. Accordingly, a set of weights composed of two row weights and two column weights is calculated for each measurement location in the image, i.e., for each location where the image misalignment was measured. The sets of weights are then mapped from the measurement locations onto each sensor element in the non-reference region to provide a set of sensor element weights for each sensor element. The sensor element weights are used to generate an interpolated value for the sensor element. The sensor element weights for each sensor element are stored in the above-mentioned non-volatile memory for use during normal operation of the color image sensor to calculate an interpolated value for the sensor element. Alternatively, to save non-volatile memory space, the above-described differences can be stored in non-volatile memory. At each power-up, the differences are re-mapped onto the sensor elements and the sensor element weights for the individual sensor elements are calculated as described above.

Using one or more of the above-described processes aligns the color image sensor in accordance with the invention to generate the color image signal that represents a subject at infinity with minimal color artifacts. With respect to a color image sensor of the type described herein, a subject more distant than about two meters can typically be regarded as being at infinity.

For an object closer than infinity, the color picture displayed in response to the color image signal generated by the color image sensor in accordance with the invention may exhibit color artifacts due to parallax caused by the spatial separation of the imaging elements. Parallax causes misalignment between at least parts of the images formed on the respective regions of the light sensor. Processes similar to the coarse, fine and mapped misalignment mitigation processes described above are used to mitigate parallax effects during normal operation of the color image sensor. Parallax mitigation differs from manufacturing misalignment mitigation in that (a) parallax mitigation includes a misalignment measurement performed in real time during normal operation of the color image sensor and using edges of the subject, and (b) the amount of parallax mitigation applied can differ significantly between different parts of the image because different parts of the subject are at different distances from the color image sensor.

In an embodiment of the color image sensor that simply applies the above-described coarse misalignment mitigation, parallax mitigation is obtained by performing misalignment measurement process 720 during normal operation of the color image sensor to measure the misalignment of the images using edges that are part of the subject. The edge detection process performed in block 724 of process 720 is typically set to start searching for edges near the middle of the images on the assumption that visible image misalignment is least desirable there. Then, in response to the misalignment measurement provided by the misalignment measurement process, the location of the (0,0) sensor element in the non-reference region is temporarily changed. When a picture is taken, the image signal component is read out from the non-reference region starting at the new location of the (0,0) sensor element. After the picture has been taken and the electrical values read out from the sensor elements, the location of the (0,0) sensor typically reverts to its original location. In other embodiments, the location of the (0,0) sensor remains where it was set by the parallax mitigation process.

The parallax mitigation process just described reduces the parallax misalignment in the portion of the image adjacent the edges on which the misalignment measurement is performed to less than the size of one sensor element. The parallax misalignment in the portion of the image adjacent the edges can be further reduced by additionally applying the fine misalignment mitigation process described above. The fine misalignment mitigation process uses the misalignment measurement taken using edges of the subject as just described.

In an embodiment in which a fine manufacturing misalignment mitigation process is performed as part of the factory alignment process, the weights generated by the fine parallax mitigation process are temporarily added to those generated by the fine manufacturing misalignment mitigation process to generate the weights used to calculate the interpolated values from the raw values generated by the sensor elements of the non-reference region.

The parallax mitigation process just described reduces parallax in portions of the image adjacent the edges used in the above-described misalignment measurement, but may increase parallax in other portions of the image. A more uniform parallax mitigation across the image is obtained by partitioning the image into areas, performing a misalignment measurement on each area and performing misalignment mitigation on the area using the measured misalignment of the area. One embodiment performs many misalignment measurements over the entire area of the image and from the misalignment measurements detects the boundaries of areas in the image having similar parallax misalignment. These areas can be regarded as corresponding to different objects in the subject. Parallax mitigation processing is then individually applied to the areas.

Figure 15:
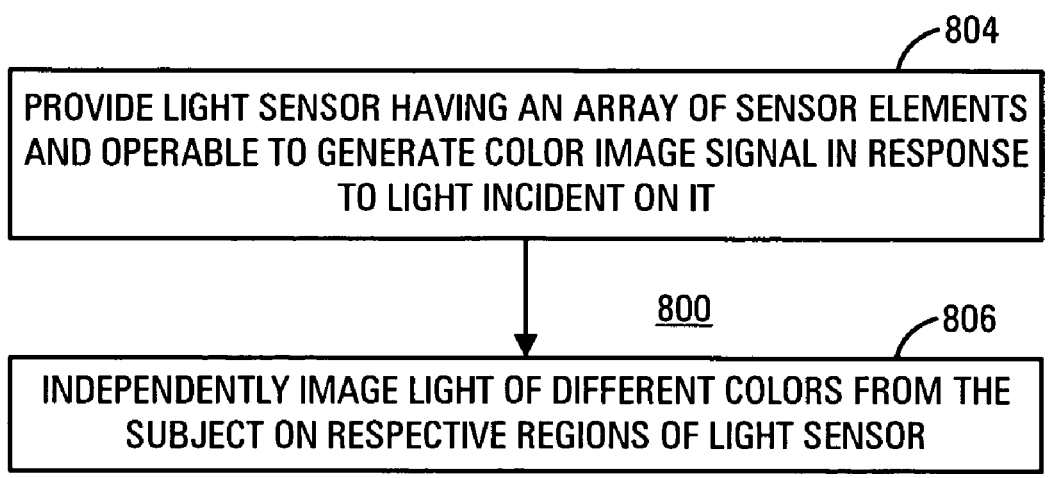
FIG. 15 is a flow chart illustrating a first embodiment of a method in accordance with the invention for generating a color image signal representing a subject.

A first embodiment 800 of a method in accordance with the invention for generating a color image signal representing a subject will now be described with reference to FIG. 15.

In block 804, a light sensor is provided. The light sensor has an array of sensor elements and is operable to generate the color image signal in response to light incident on it.

In block 806, light of different colors from the subject is independently imaged on respective regions of the light sensor.

In one embodiment, light is filtered from a portion of the light from the subject to provide light of a first color. In another embodiment, light is filtered from another portion of the light from the subject to provide light of a second color.

In another embodiment, the color image signal has an image signal component corresponding to each of the regions of the light sensor, the imaging forms an image on each of the regions of the light sensor, and the image signal components are processed to remove the effects of parallax between the images from the color image signal.

In another embodiment, imaging elements are provided and the imaging elements are affixed to the light sensor, the color image signal has an image signal component corresponding to each of the regions of the light sensor, and the image signal components are processed to remove from the color image signal effects of misalignment between the imaging elements and the light sensor.

In another embodiment, the color image signal has an image signal component corresponding to each of the regions of the light sensor, the exposure times used to generate the image signal components are controlled independently of one another, and the image signal components are processed to generate the color image signal. The processing includes correcting for differences in the exposure times.

Figure 16:
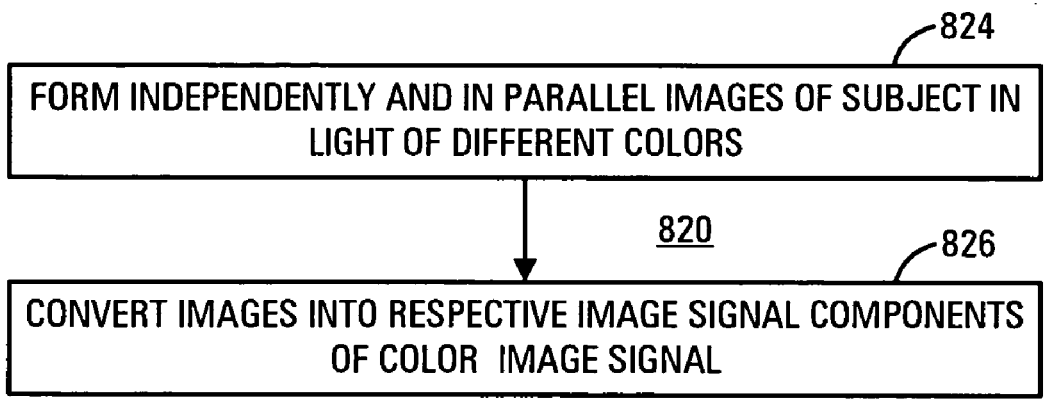
FIG. 16 is a flow chart illustrating a second embodiment of a method in accordance with the invention for generating a color image signal representing a subject.

A second embodiment 820 of a method in accordance with the invention for generating a color image signal representing a subject will now be described with reference to FIG. 16.

In block 824, images of the subject are independently and in parallel formed in light of different colors.

In block 826, the images are converted into respective image signal components of the color image signal.

This disclosure describes the invention in detail using illustrative embodiments. However, the invention defined by the appended claims is not limited to the precise embodiments described.

We claim:

1. A color image sensor for generating a color image signal representing a subject, the image sensor comprising:
   an imaging element array configured as a unitary, open-bottomed box comprising:
      an optical substrate including:
         a first imaging element comprising a first refractive surface defined in an external major surface of the optical substrate, and
         a second imaging element comprising a second refractive surface defined in the external major surface of the optical substrate, the first and second refractive surfaces each configured to image light of a respectively different color,
      a plurality of side portions of the open-bottomed box, and
      a screen extending from one side portion to an opposite side portion of the open-bottomed box between the first and the second imaging elements for separating the first and second imaging elements, the screen including a light absorbing material such that (1) light imaged by the first imaging element is blocked by the screen from being incident on a second region of sensor elements, and (2) light imaged by the second imaging element is blocked by the screen from being incident on a first region of sensor elements; and
   a light sensor configured on a further substrate, the light sensor comprising:
      the first and second regions of sensor elements disposed on the further substrate opposite the first and second imaging elements, respectively, and
      one or more attachment pads attached to the further substrate for aligning the imaging element array to the light sensor and for affixing the imaging element array to the further substrate, the one or more attachment pads affixed to and aligned with the plurality of side portions and the screen using solder such that the first and second regions of sensor elements are encapsulated inside the unitary open-bottomed box.

2. The image sensor of claim 1, wherein the light sensor comprises three regions of the sensor elements with centers of each of the three regions located at apices of a triangle.

3. The image sensor of claim 1, wherein the first and second regions of image sensors are juxtaposed at adjacent corners.

4. The image sensor of claim 1, wherein:
   the first imaging element additionally comprises a first correction element defined in an internal major surface of the optical substrate, the first correction element axially aligned to the first refractive surface; and
   the second imaging element additionally comprises a second correction element defined in an internal major surface of the optical substrate, the second correction element axially aligned to the second refractive surface.

5. The image sensor of claim 4, in which at least one of the first or the second refractive surfaces comprises a convex surface structured to image light of a corresponding color.

6. The image sensor of claim 5, in which the convex surface is aspherical.

7. The image sensor of claim 5, in which:
   the convex surface is spherical; and
   at least one of the first or the second correction element comprises an aspherical surface opposite the spherical convex surface, the aspherical surface structured to correct aberration with respect to light of the respective color.

8. The image sensor of claim 5, in which:
   the convex surface is spherical; and
   at least one of the first correction element or the second correction element comprises a diffractive element opposite the convex spherical element, the diffractive element structured to correct aberration with respect to light of the corresponding color.

9. The image sensor of claim 4, additionally comprising a first color filter disposed between the first imaging element and the light sensor, the first color filter configured to transmit light of a first color to a first one of the first and second regions of the sensor elements.

10. The image sensor of claim 9, additionally comprising a second color filter disposed between the second imaging element and the light sensor, the second color filter configured to transmit light of a second color, different from the first color.

11. The image sensor of claim 9, in which:
   the light sensor additionally comprises an additional region of sensor elements; and
   the image sensor additionally comprises a polychromatic imaging element disposed opposite the additional region of sensor elements to image broad-spectrum light from the subject thereon.

12. The image sensor of claim 11, in which the first one of the regions and the additional region are equal in at least one of (a) area or (b) number of sensor elements.

13. The image sensor of claim 11, in which the first one of the regions and the additional region differ in at least one of (a) area or (b) number of sensor elements.

14. The image sensor of claim 11, in which the sensor elements of the first one of the regions and the sensor elements of the additional region differ in area in a ratio that equalizes sensitivity to the respective light incident thereon.

15. The image sensor of claim 11, in which the optical substrate defines a mount for the polychromatic imaging element.

16. The image sensor of claim 4, in which the optical substrate is stepped to locate the first and second imaging elements at a respectively different distance from the light sensor.

17. The image sensor of claim 1, wherein:
   the imaging element array includes an attachment portion forming at least one opening in the open-bottomed box; and
   the one or more attachment pads are configured to fix the regions of sensor elements in a position opposite the first and second imaging elements of the imaging element array via the attachment portion of the imaging element array.

18. The image sensor of claim 1, wherein:
   the imaging element array includes an attachment portion for fixing alignment of the optical axis of the first and second image elements of the imaging element array with respect to respective regions of the sensor elements; and the one or more attachment pads attached to the further substrate are configured to fix the attachment portion to the further substrate such that the respective regions of sensor elements are aligned with the position opposite the first and second imaging elements of the imaging element array via the attachment portion and the one or more attachment pads.

19. The image sensor of claim 18, wherein the unitary, open-bottomed box and the image sensor array are structure to be aligned using a jig such that when aligned and heated, the attachment portion and the one or more attachment pads are affixed together by a reflow of the solder on the one or more attachment pads.

20. The image sensor of claim 18, wherein the one or more attachment pads include a solder layer of the solder used for attaching the attachment portion and the one or more attachment pads together.

* * * * *